Nov. 7, 1967 R. C. KUNZELMAN ET AL 3,351,714

MOBILE RADIO TELEPHONE APPARATUS

Filed May 12, 1964

7 Sheets-Sheet 1

INVENTORS.
Ronald C. Kunzelman,
James D. Malone,
by Fraser and Bogucki
Attorneys INVENTORS
Ronald C. Kunzelman
James D. Malone
by Fraser and Bogucki
Attorneys Nov. 7, 1967 R. C. KUNZELMAN ET AL 3,351,714

MOBILE RADIO TELEPHONE APPARATUS

Filed May 12, 1964

7 Sheets-Sheet 3

MOBILE RADIO TELEPHONE APPARATUS

Filed May 12, 1964

INVENTORS.
Ronald C. Kunzelman,
James D. Malone
by Fraser and Bogucki
Attorneys

Nov. 7, 1967 R. C. KUNZELMAN ET AL 3,351,714

MOBILE RADIO TELEPHONE APPARATUS

Filed May 12, 1964 7 Sheets-Sheet 5

INVENTORS
Ronald C. Kunzelman,
James D. Malone
by Fraser and Bogucki
Attorneys 3,351,714
MOBILE RADIO TELEPHONE APPARATUS
Ronald C. Kunzelman, Kentfield, and James D. Malone, San Mateo, Calif., assignors to Secode Corporation, San Francisco, Calif., a corporation of California
Filed May 12, 1964, Ser. No. 366,789
29 Claims. (Cl. 179—41)

ABSTRACT OF THE DISCLOSURE

Apparatus for use with radio equipment to provide automatic dial telephone service in mobile units, which units are arranged to be compatible with manual radio telephone systems and provide for channel selection within a preselected group of channels for operation in different radio telephone systems using different frequencies.

This invention relates to mobile radio telephone systems and more particularly to equipment for use in a mobile vehicle for communicating with a base terminal in such a system.

Mobile radio telephone communication is becoming an increasingly important adjunct to the overall telephone system. Systems presently in use which were designed for manual operation (that is, all calls placed through an operator) are inadequate to handle the increased demand for mobile radio telephone service presently encountered. The overload placed on existing mobile radio telephone communication systems by the demand for service, both the demand for radio channels by actual subscribers wanting to place calls and that of would-be users who are awaiting permission to have mobile telephones installed, is such as to render the service almost intolerable. The limited number of radio channels which is allotted for use in mobile radio telephone communications is a principal factor in denial of such service to such would-be users. Moreover the dependence of existing systems upon operators in the placing of calls further limits the efficiency of mobile radio telephone service. However, the adoption of a new mobile radio telephone system which could reduce the time during which particular channels are tied up in the placing of calls and in other non-communication functions and which could provide automatic operation without dependence on operators would materially increase the efficiency of use of the available channels and extend the use to additional mobile radio telephone subscribers with an improved grade of service.

Such a mobile radio telephone communications system has been proposed and is the subject of patent application Ser. No. 157,306 of Chandos A. Rypinski, entitled Multiple Channel Radio Telephone System, filed Dec. 1, 1961, now Patent 3,173,996. This system not only enables the placing of more calls on a given number of channels by reducing the time a selected channel is tied up in the processing of a call, but it provides automatic mobile radio telephone service without the need for an operator to handle each call, thus rendering a grade of service which is more directly comparable to what is offered in present automatic exchange, land line telephone systems than what is available in existing mobile radio telephone systems. In this system, an arrangement is provided for marking the next idle channel on which a call is to be placed and all of the mobile radio telephones not actually engaged in a call are arranged to be tuned to the marked idle channel. As this idle channel is made busy by the placing of a call thereon in either direction between the mobile radio telephone and the base terminal, the mark is shifted to a succeeding idle channel which is to be used for the next communication, and the remaining idle mobile telephones are tuned to the newly marked idle channel. Each mobile radio telephone includes a selector which is responsive to only that mobile radio telephone's number in receiving a call from the base terminal and which pulses the coded number to the base terminal as soon as the mobile radio telephone initiates a demand for service. Thus mobile identification is provided and automatic billing for toll calls may be accomplished in a manner similar to that practiced with respect to land line subscribers; the need for an operator in the placement of every call is obviated. It will be appreciated that the automatic placement of calls in this manner substantially reduces the time required, and thus more efficient use of the available channels for communication purposes is achieved.

It is desirable that mobile radio telephone equipment for use in such a system have certain capabilities which make the system compatible with those radio telephone communication systems presently in use as well as with the improved system. Thus manual operation will be important as long as present systems are in use, but in addition it is desired that automatic channel selection be freely available, regardless of whether the mobile radio telephone is located in its own home area or whether it is placing or receiving calls in a different area which may be assigned a different set of radio channels from that which is in use in the mobile's home area. Other desirable features are of importance in refining the system to provide the best grade of service which is possible within the inherent capability of the system.

Accordingly, therefore, it is a general object of the present invention to provide improved mobile radio telephone equipment.

It is a more specific object of the present invention to provide mobile radio telephone equipment which is freely usable in an automatic mobile radio telephone communication system while being also compatible with existing manual or operator-controlled mobile radio telephone systems.

It is one specific object of the present invention to provide mobile radio telephone equipment for automatically searching among only those radio channels which are in use in a given geographical area.

It is a further object of the present invention to minimize the possibility of simultaneous seizure of a given radio channel by more than one mobile radio telephone during the initiation of a call thereon.

It is another object of the present invention to reduce the time required to establish a communication channel in either direction between a particular mobile radio telephone and a base terminal. Specifically, it is an object of the invention to provide for the release of the idle mobile radio telephones from a selected channel as soon as it is determined that they are not involved in a call being initiated from the base terminal.

Arrangements in accordance with the present invention provide supervisory and control units for use with vehicular radio equipment to achieve automatic dial service in the respective mobile telephone installations. In addition, this equipment is compatible with the service in mobile telephone system manual service areas. To a considerable degree the mobile radio telephone service is equivalent to wire line service. Two-way audio communication is provided in full duplex with continuous transmission to and from the mobile station. Cooperation between a base station and mobile units in achieving automatic telephone service is controlled in response to supervisory signals which may be sent in either direction over a channel. Automatic multi-channel access is provided for each mobile installation whereby all idle mobile telephones hunt for and lock to the particular channel which has been marked idle by the base station. The next call in either direction will be completed over that channel, and all mobile telephones not involved are transferred to the next radio channel marked idle as soon as a particular channel is seized for a call. Thus, any channel not in use is available for a call in either direction as soon as it is marked idle by the base station. Furthermore, there is a high degree of privacy for normal communication in the automatic mode, as the automatic supervision provided in this mode prevents other mobiles from listening to a channel already engaged in a call.

In accordance with one aspect of the invention the possibility of simultaneous seizure of a channel by two mobiles on mobile initiated calls is minimized by the provision of a very limited time interval (on the order of 50 milliseconds) during which connection may occur.

Moreover, in accordance with another aspect of the invention, during the time that a call is being placed to a particular mobile radio telephone, all idle mobile radio telephones are blocked from initiating any calls on the seized channel. An indication of the blocked condition is provided only when the mobile telephone handset is lifted in an attempt at call initiation, thus reducing the probability of simultaneous demand for a channel by two or more mobiles. As the number of the called mobile is being pulsed out by the base station, the other mobiles are permitted to drop off the seized channel and hunt for the next marked idle channel as soon as these other mobiles detect a code mismatch. In this manner, the time during which all mobiles are blocked from placing a call is reduced.

Particular arrangements in accordance with the present invention provide for repetitive ringing of the selected mobile radio telephone under control of the base station, thus eliminating the need for timing and time-out equipment in the mobile unit. Mobile telephone station operation is fully automatic; a mobile unit may call any land or other mobile telephone by dialing the desired directory number conventionally. The calling mobile telephone identifies itself automatically, thus permitting the direct dialing of toll and long distance calls as well as local calls from the mobile telephone station without the need for operator attention.

One particular arrangement in accordance with the invention is physically divided into a supervisory unit, a control unit and a radio with channel searching capability. The supervisory unit and the radio are designed for mounting within the trunk of an automobile, whereas the control unit is intended for mounting on the transmission tunnel or instrument panel. Suitable interconnecting cable is provided. The entire system is arranged to be powered from the conventional automotive electrical system.

In accordance with the particular aspect of the invention, the control unit includes an arrangement for operating the equipment in one of three different modes, namely a HOME mode, a ROAM mode or a MANUAL mode. Channel selecting circuitry is provided which is interlocked with the mode selector for operation in distinct selection patterns, depending on which mode of operation is established. The control unit is arranged so that it may be programmed at the time of installation to cause the radio to search for an idle marked channel among only those channel frequencies which are assigned to the base station in the home area of the particular mobile telephone station. In this manner, selection of the HOME mode operation automatically limits channel searching to the particular frequencies of the home area. When the equipment is selected to be operated in the ROAM mode, however, the control unit provides for the optional programming by the subscriber of the particular channels which are to be searched for the marked idle channel, thus permitting the subscriber to choose the specific channels corresponding to the frequencies assigned in the geographical area in which the vehicle is roaming. Whether in the HOME or ROAM mode of operation, the mobile station will respond only to the particular frequencies employed as mobile telephone system signaling tones. When the MANUAL mode is selected, however, the mobile is arranged to be fully compatible with manual radio telephone systems. Automatic channel searching is disabled and channel selection is under direct control of the subscriber. In the MANUAL mode, the mobile station is arranged to respond only to the particular frequencies employed in manual system signaling. Specific switching logic circuitry is arranged to prevent activation of the mobile radio transmitter if the subscriber inadvertently operates the push-to-talk switch while lifting the handset in the MANUAL mode.

A better understanding of the invention may be had from a consideration of the following detailed description, taken in conjunction with the accompanying drawings, in which.

Figure 1:
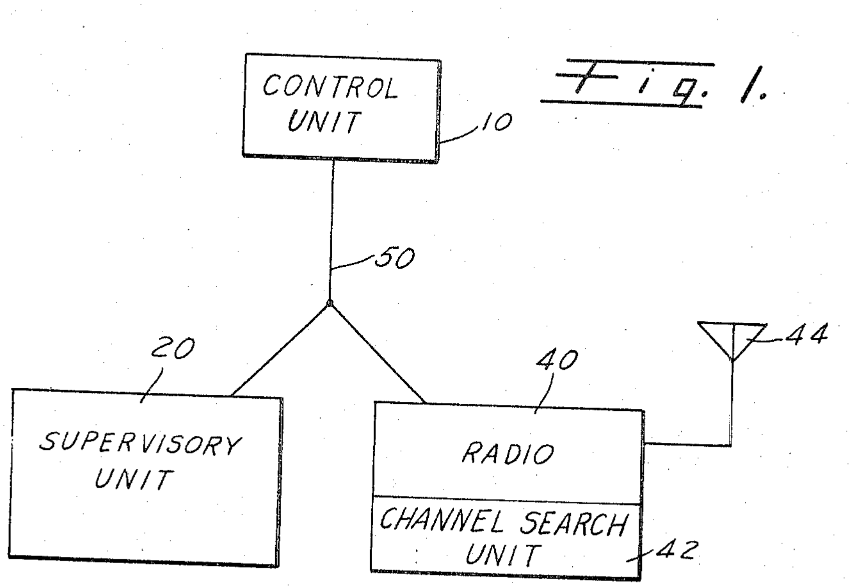
FIG. 1 is a block diagram representing one particular arrangement in accordance with the invention.
Figure 5:
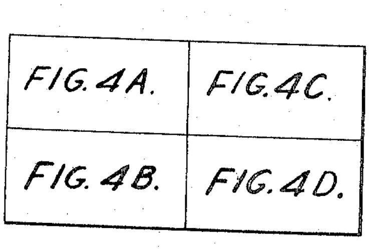
Figure 6:
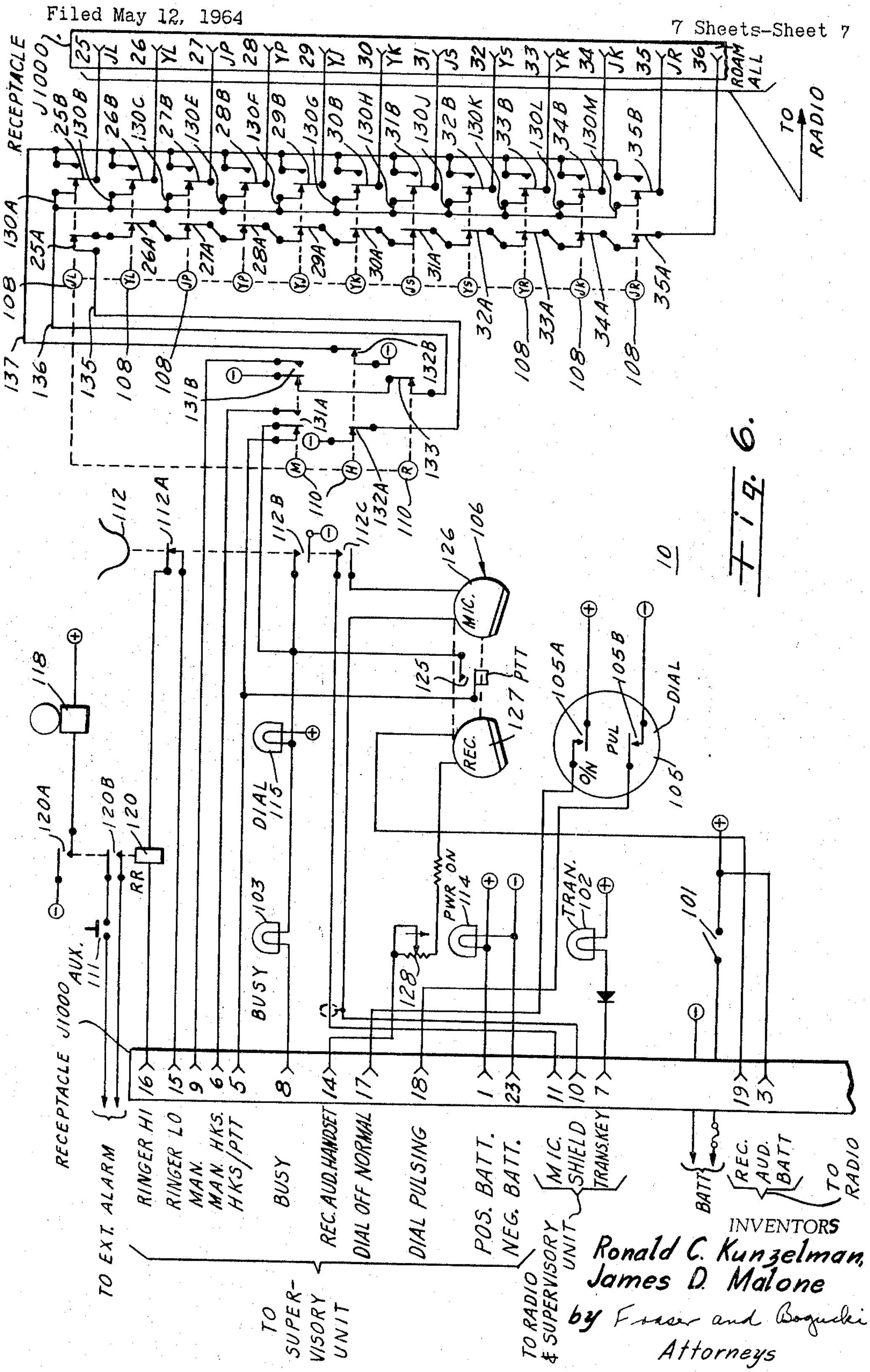

FIGS. 4A, 4B, 4C and 4D comprise a schematic diagram of a particular circuit for use in the arrangement of FIG. 1;

FIG. 5 is a diagram showing the relative positions of FIGS. 4A–4D with respect to each other; and FIG. 6 is a schematic diagram of a circuit corresponding to the control unit portion of FIG. 1.

In FIG. 1, one particular arrangement of radio telephone equipment in accordance with the invention for mounting in a mobile vehicle is shown comprising a control unit 10, a supervisory unit 20, and a radio 40. The radio 40 is shown including a channel search unit 42 and is connected to an antenna 44 for the transmission and reception of radio telephone communications. The radio 40 is tunable to the frequency channels employed in mobile radio telephone communications under the control of the channel search unit 42. Suitable interconnecting cable 50 is shown connecting the control unit 10, the supervisory unit 20 and the radio 40. In a preferred arrangement, the supervisory unit 20 and the radio 40 are mounted in the trunk of the vehicle while the control unit 10 is mounted in the vicinity of the vehicle instrument panel and connected to the trunk mounted units by the cable 50.

Figure 2:
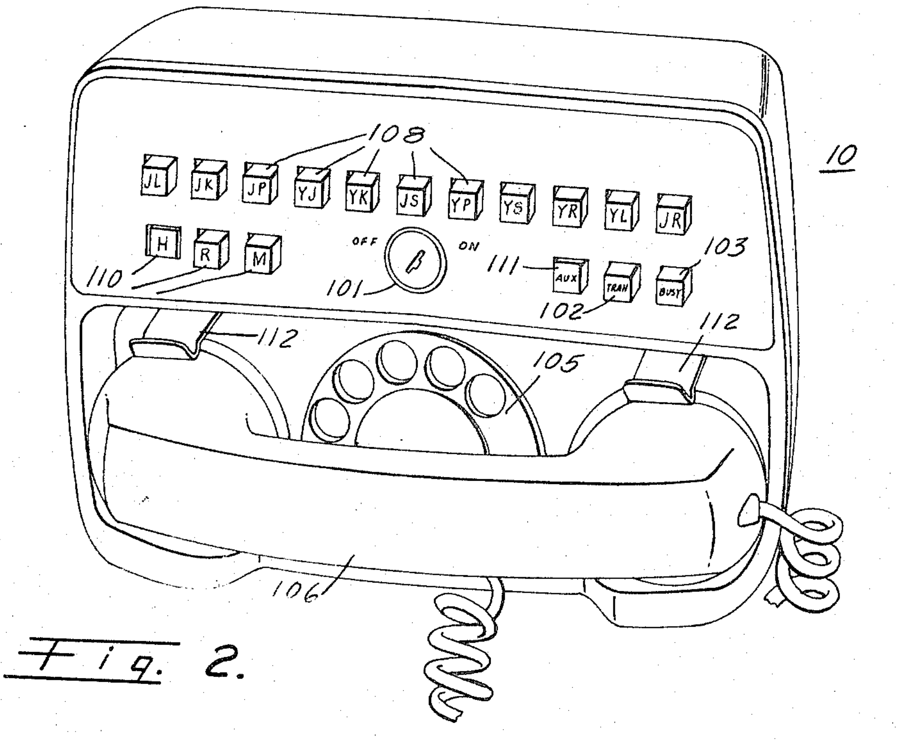
FIG. 2 is a perspective view of a portion of the arrangement shown in FIG. 1.

One particular physical configuration of a control unit 10 is shown in FIG. 2 comprising an ON-OFF key switch 101, a TRANSMIT light 102, a BUSY light 103, a dial 105, a handset 106, and a plurality of switches for controlling the associated equipment. The switches are in the form of CHANNEL SELECTOR push-buttons 108, MODE SELECTOR push-buttons 110, and an AUXILIARY push-button 111. Also included, but not shown in FIG. 2, are lamps for illuminating the dial 105 and for indicating that electric power is turned on to the equipment. A push-to-talk switch is positioned out of sight on the underside of the handset 106. Levers 112 are an extension of a switch-hook which is manipulated in accordance with the position of the handset 106.

By a suitable operation of the control unit 10, the mobile radio telephone customer is enabled to select one of three possible modes of operation for his equipment. The particular mode of operation is determined by pushing one of the MODE SELECTOR buttons 110 to put the equipment in the HOME, ROAM, or MANUAL mode. The MODE SELECTOR push-buttons 110 are mechanically interlocked with the CHANNEL SELECTOR push-buttons 108 so that all of the push-buttons 108 are released when the HOME mode button 110–H is depressed. By means of a particular circuit which is established when the equipment is installed in a vehicle, operation in the HOME mode causes the channel search unit 42 and the radio 40 to scan for an idle marked channel over only those channels in a preset group which corresponds to the radio channel assignment of the home area. In this mode, the supervisory unit 20 is programmed for automatic operation. If the customer roams into a foreign area with automatic mobile telephone service equipment, the ROAM push-button 110–R is depressed. The customer then selects, by depressing suitable CHANNEL SELECTOR push-buttons 108, the particular channels which are assigned in that foreign area. In this mode, the channel search unit 42 and radio 40 are controlled to scan only those channels which are selected by the push-buttons 108 in searching for an idle marked channel. However, if none of the CHANNEL SELECTOR push-buttons 108 are depressed in the ROAM mode, all of the channels are scanned during idle mark search. In all other respects, the mobile equipment operates the same as in the HOME mode.

If the customer is in a manual service area, service can be obtained by depressing the MANUAL mode push-button 110–M. The radio 40 is then tuned to a selected one of the local channels by depressing the appropriate CHANNEL SELECTOR push-button 108. In the MANUAL mode, operation is in the conventional manner with transmitter keying controlled by the push-to-talk switch on the handset 106, and with all calls being completed through an operator.

In accordance with the nation-wide telephone numbering system, each mobile unit is assigned a unique nation-wide ten-digit number of the form NPA–ABX–1234. The first three digits are the Numbering Plan Area Code, the next three are the Automatic Branch Exchange, and the last four digits are the mobile unit's line assignment in the central office. The mobile unit's local directory number listing is ABX–1234.

The mobile selector code (which is the same for both mobile signalling and mobile identification) is the seven-digit code NPA–1234; the branch exchange code is not included. Thus, to preserve uniqueness, a particular –1234 combination is assigned to only one mobile unit in each Numbering Plan Area. Each Numbering Plan Area has the capacity for 10,000 mobile stations.

The automatic mobile telephone system base station marks (that is, modulates) with idle tone the channel which is to be used for the next call to be established in either direction. All idle mobile units in the area are automatically controlled to search for and lock onto this marked idle channel. The radio 40 is equipped with a clock driven scanner which causes the radio 40 to cycle through a selected set of channels at a rate of approximately four steps per second. The clock is controlled by the supervisory unit 20 and is turned on when search for a new marked idle channel is indicated. The radio then immediately steps to the next channel in sequence. If the supervisory unit 20 does not find idle tone on this channel, the clock is left running and ¼ second later the radio advances one more channel. If none of the selected channels is marked with idle tone, the radio 40 continues to scan the set of channels in a ring sequence. The clock is stopped when idle marking tone is detected by the supervisory unit 20, thus locking the radio 40 on the marked idle channel. Detection of idle tone incorporates a .1-second recognition delay to avoid stopping on a channel with voice or signal pulsing. Channel search will be initiated if idle tone is absent for more than .1 second; however brief fades of idle tone do not cause the channel to be abandoned.

Figure 3:
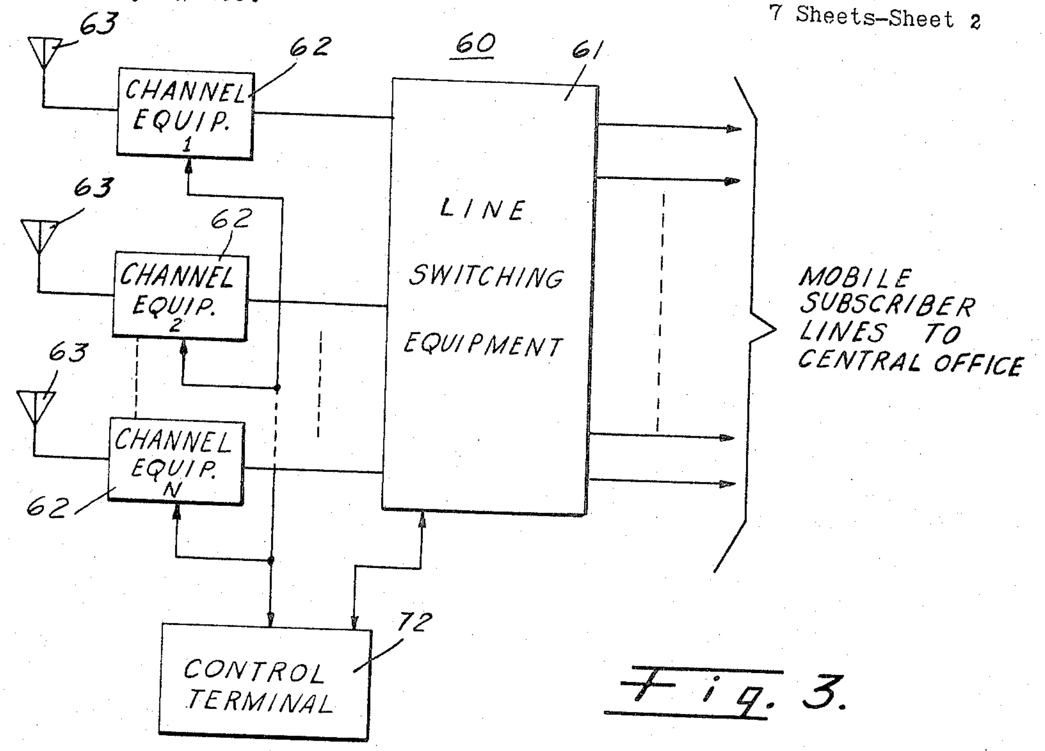
FIG. 3 is a block diagram of base station equipment for communicating with the mobile radio telephone equipment represented in FIG. 1.

FIG. 3 represents a typical base station for use in communicating with the mobile telephone equipment represented in FIG. 1. As shown in FIG. 3, the base station 60 comprises line switching equipment 61 connected between a plurality of channel equipment stages 62 and a number of mobile subscriber lines leading to an associated central office. Each channel equipment stage 62 is connected to an antenna 63 and will be understood to include a radio receiver and transmitter for communication with the mobile radio telephone equipment, together with suitable tone generators for providing idle tone, seize tone, ringing tone and the like. Each channel equipment stage 62 may also include a register for recording a subscriber telephone number. One channel equipment stage 62 is provided for each radio channel assigned in the area served by the base station. A control terminal 72 is included to control the various portions of the base station 60 involved with channel selection and call establishment.

*General operation*

The general operation of the automatic mobile telephone system in which the mobile telephone equipment in accordance with the present invention is employed may be described as follows, beginning with the placing of a call from a land customer to a mobile subscriber. The geographical area covered by one automatic mobile telephone system base station is the home area for all mobile units assigned to that station. There may be from two to eight channels employed in this area, depending upon the number of mobile customers. Two-way customer dialing is provided in the home area with automatic call handling throughout.

*Call initiation—land to mobile*

As a starting point, all idle mobiles in the home area may be assumed to be locked to the marked idle channel. A land customer dials the local seven-digit directory number ABX–1234 and reaches the line switching equipment 61 where each mobile is given a line appearance in the home area central office. The control terminal 72 thereupon is activated to seize the marked idle channel by shifting the modulation frequency of channel carrier from idle tone to seize tone. Detection at the mobile units of seize tone on the marked channel holds all mobile units on that channel, but blocks them from originating a call until after release from the immediate call. The control terminal 72 immediately places idle tone on the next available channel. From the selected line (ABX–1234) in the line switching equipment 61, the control terminal 72 translates to the selected mobile unit number (NPA–1234) for outpulsing. Mobile unit signalling is accomplished by frequency shift keying between seize and idle tones with the mobile unit selectors being pulsed once for each transition from seize tone to idle tone. Outpulsing may be at twenty pulses per second with a suitable interdigital time. A check is performed after each received digit by the mobile supervisory unit 20 and as soon as a digit mismatch is detected, indicating that the call is intended for another mobile unit, the supervisory unit 20 commands the channel search unit 42 to abandon the seized channel and to search for the next available channel newly marked with idle tone.

On completion of the selective signalling from the base station, all mobile units except the selected one will have abandoned the seized channel to seek the new marked idle channel. In the selected mobile unit, on completion of signalling the supervisory unit 20 energizes the transmitter of the radio 40 for ¾ second to transmit an Acknowledgement signal to the base station. The Acknowledgement signal may be the same as the Disconnect signal which is a combination of a disconnect tone ($F_d$) with a guard tone ($F_{g1}$). If the base station does not receive the Acknowledgement signal within three seconds after signalling the selected mobile unit, seize tone is removed from the channel and the call is abandoned. However, if the Acknowledgement signal is received, the base station then sends repetitive ringing with additional pulses (i.e., frequency shift keying between seize tone and idle tone) at 20 pulses per second in the standard cycle of one second on followed by five seconds off. This causes the ringing of the bell in the control unit 10 of the selected mobile station. If the mobile subscriber does not answer the ringing within 45 seconds, the base station abandons the call and removes all tones from the particular channel. Loss of seize tone causes the mobile station supervisory unit 20 to abandon the call and to initiate search for a new idle channel.

After acknowledgement, lifting of the handset 106 by the mobile subscriber turns on the transmitter of the radio 40 and causes the supervisory unit 20 to send a 0.2 second burst of Answer signal, which may be a combination of a connect tone ($F_c$) with a guard tone ($F_{g1}$). Upon receipt of the Answer signal, the control terminal 72 discontinues ringing and establishes a talking path between the calling party and the particular channel equipment 62 which is transmitting on the selected channel. In the mobile station, the supervisory unit 20 activates the audio circuit of the mobile handset 106 upon termination of the 0.2 second Answer burst.

*Disconnect*

At the termination of the call, the mobile handset 106 is returned to its cradle, thus causing the supervisory unit 20 to send a Disconnect signal for ¾ second, which may be a combination of a disconnect tone ($F_d$) with a guard tone ($F_{g1}$). Thereafter, the supervisory unit 20 turns off the transmitter of the radio 40 and the TRANSMIT lamp 102 in the control unit 10 and then causes the channel search unit 42 and the radio 40 to initiate search for a marked idle channel. The control unit 10 then becomes blocked when the handset 106 is returned to its cradle and remains blocked until the mobile station is again locked to the marked idle channel.

*Call initiation—mobile to land*

The setting up of a call from a mobile subscriber to a land subscriber or other mobile subscriber is initiated by the mobile subscriber lifting the handset 106 from its cradle. As a starting point in describing this sequence, it will be assumed that all mobile stations in the home area are locked to the marked idle channel. A mobile customer going off-hook will find his BUSY lamp 103 lighted and the handset inoperative if his unit was blocked at the instant of going off-hook. The BUSY lamp indicates to the customer that no channel is available, or that the supervisory unit 20 was unsuccessful in attempting to seize the marked idle channel. To make another attempt to connect to a marked idle channel, the mobile customer must hang up and try again because the blocking function is latched by the handset hook-switch in the control unit 10. This particular arrangement reduces the probability of simultaneous channel seizure by two or more mobile units which might otherwise attempt to place a call immediately, and therefore simultaneously, as soon as a channel is available. Connecting the busy lamp under hook-switch control prevents a customer from knowing when his mobile becomes unblocked and thus imposes a forced randomness on the call initiation demands.

If a mobile unit is resting on the marked idle channel upon going off-hook, the supervisory unit 20 energises the transmitter of the radio 40 and initiates the connect sequence. This sequence consists of two phases, namely the connect delay interval (nominally 150 milliseconds with a minimum of 100 milliseconds) to allow for the mobile transmitter rise time and to alert the base station, and the connect interval (50 milliseconds). The transmitter of the radio 40 is modulated to send a guard tone ($F_{g1}$) continuously from the moment the transmitter is turned on and a short pulse of connect tone ($F_c$) is added during the connect interval. Upon receipt of the Connect signal comprising the combination of the connect tone ($F_c$) with the guard tone ($F_{g1}$), the base station immediately removes idle tone from the previously marked channel and places it on the next available channel. Detection of idle tone drop-out causes all on-hook mobile units to be blocked, and after the 0.1 second slow release interval, the blocked mobiles are controlled to step to the next channel in search of the newly marked idle channel.

In order for seizure of the marked idle channel to be effected, a mobile unit attempting to connect must detect the drop-out of idle tone during its connect interval. If idle tone drop-out is detected too soon (during the connect delay interval) the unit is immediately blocked and the connect sequence is aborted; the transmitter of the radio 40 is then turned off and the BUSY lamp 103 is energized. On the other hand, if idle tone is still present on the marked channel after the connect interval, the supervisory unit 20 likewise terminates the attempt to connect. Thus the possibility of a valid seizure of the marked channel by two mobile units simultaneously is virtually eliminated; simultaneous channel seizure by two mobiles is possible only if there is an overlap of their connect intervals (50 milliseconds) which is an extremely unlikely event. In the case of a valid seizure of the channel by the calling mobile station, the supervisory unit 20 thereof removes connect tone ($F_c$) from the carrier at the end of the connect interval and the transmitter of the radio 40 remains on with guard tone modulation.

The control terminal 72 at the base station places seize tone on the seized channel ¼ second after seizure by the calling mobile station in order to prime the off-hook mobile station for Automatic Number Identification (ANI). When the control terminal 72 is ready, seize tone is removed as the command to start pulsing the automatic number identification code. At this stage, the .1 second slow release interval which is applicable to the detection of seize tone removal (mentioned above) is effective in reducing the possibility of a premature starting on Automatic Number Identification which might otherwise result from noise or a brief channel failure. Following detection of seize tone removal, the supervisory unit 20 then outpulses the particular code assigned to the mobile station (NPA–1234) at 20 pulses per second with a 25 millisecond burst of connect tone for each pulse. On completion of ANI pulsing the guard tone is terminated and the handset 106 is activated. At the base station, the control terminal 72 verifies the first three digits as the home NPA code and translates the last four digits to the mobile customer line location in the line switching equipment 61. The selected line is then connected to the seized channel via the corresponding channel equipment stage 62, and the line is placed in the "off-hook" condition. Dial tone from the central office is then passed to the vehicular handset 106 over the established radio link.

In the event that the ANI code from the mobile station cannot be matched to a local line appearance in the line switching equipment 61, the control terminal 72 may route the call to an operator for manual completion. This situation may occur if the call is originated from a mobile station which is roaming from another terminal area, if there is a channel failure during ANI pulsing (as detected by a momentary drop-out of guard tone), or by a circuit malfunction.

When dial tone is received on the established radio link, the mobile customer may dial his call. The handset 106 is muted and a guard tone ($F_{g2}$) is transmitted while the dial 105 is off normal. Each pulse from the dial 105 is represented with connect tone ($F_c$). The base station converts each transmitted pulse signal to a conventional break of the customer's line from the line switching equipment 61 to the central office.

Disconnect of an established radio link is identical for both land-originated and mobile-originated calls. At the end of the call, return of the mobile handset 106 to its cradle initiates the Disconnect procedure as described above.

*ROAM mode*

All calls from a roaming mobile station are operator-handled with the full ten-digit number being required to identify the mobile station. A roaming mobile station wishing to receive calls must notify his would-be caller to contact the particular mobile service operator for the automatic mobile telephone service area in which he will be located. In such cases, the operator controls the placing of the call in the manner described above for a land-originated call in an automatic mobile telephone system area. Whenever the identification of a mobile unit originating a call is not locally registered, the control terminal 72 of the base station may route that call to an operator for manual completion. The calling mobile customer must identify himself to the operator with a full ten-digit number in order to permit the proper assignment of charges.

*MANUAL mode*

In addition to providing the operator with the ten-digit code address of the mobile roaming in a manual area, a would-be caller also provides the operator with the letter designation (for example, JL) of the particular radio channel to which the roaming mobile station is tuned. To originate a call in a manual area, a mobile customer must go off-hook and monitor the channel for activity. If the channel is clear a mobile operator may be signalled by a two-second burst of carrier frequency, using the push-to-talk button on the handset 106. In order to avoid inadvertent transmission at the time the handset 106 is removed from its cradle, operation of the push-to-talk button within .1 second after the handset 106 is lifted from the hook switch will energize the busy lamp 103 rather than key the transmitter of the radio 40. Subsequent release of the push-to-talk button will extinguish the busy lamp 103 and permit normal operation.

Figure 4A:
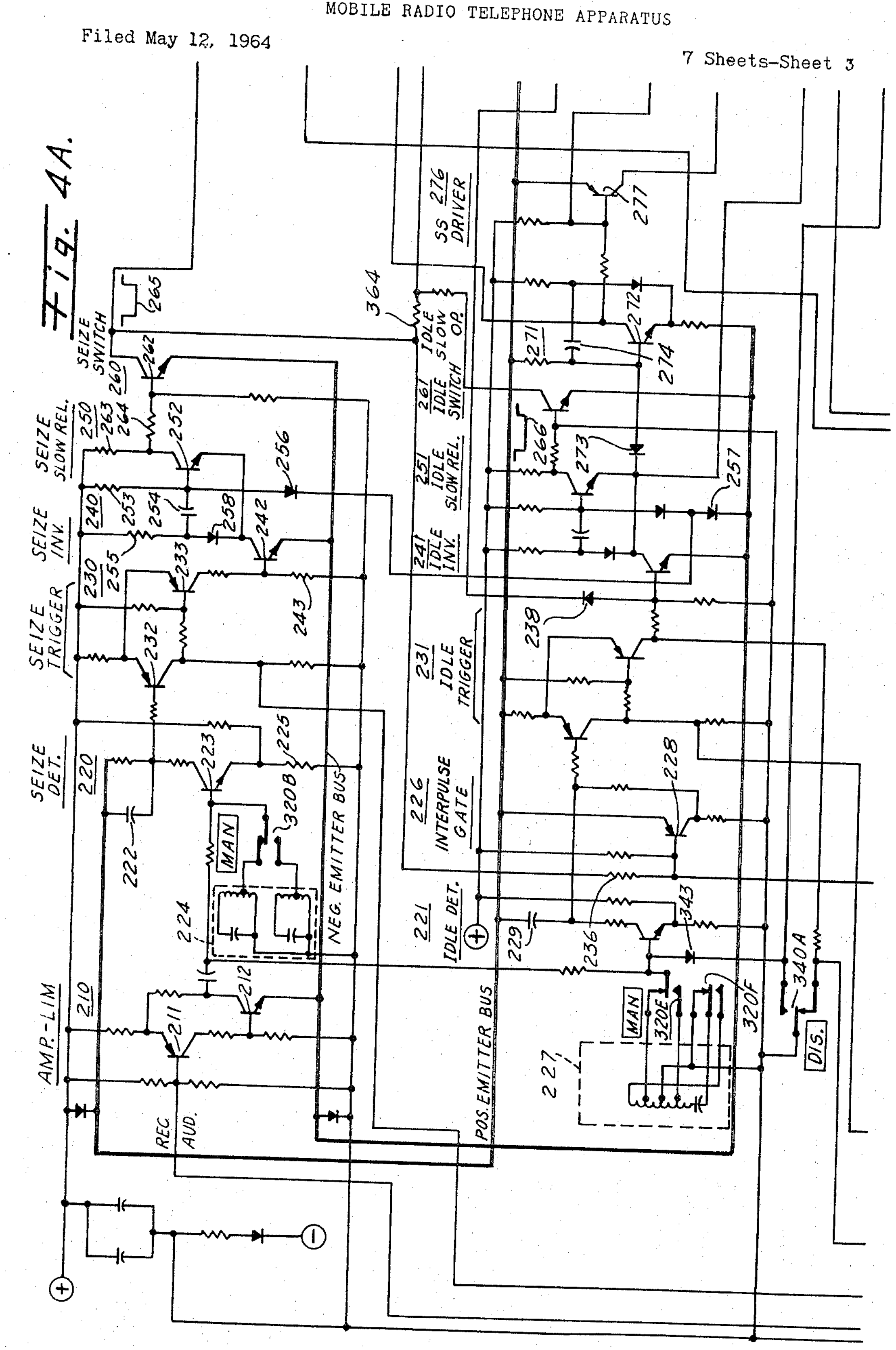

FIGS. 4A–4D comprise a schematic diagram of one particular circuit which may be employed as the supervisory unit 20 in the arrangement of the invention shown in FIG. 1. The portion of the circuit in FIG. 4A shows an amplifier-limiter stage 210 consisting of complementary transistors 211 and 212 coupled in a common emitter feedback circuit for amplifying the audio signals received from the receiver of the radio 40. This stage has sufficient voltage gain to provide peak limiting at the output for all acceptable input signal levels. This clipping effect provides effective noise limiting as well as amplitude stabilization of signal level to the following stages. The output of the amplifier-limiter 210 is coupled to a seize detector stage 220 comprising a transistor 223. The seize detector 220 includes a tone resonant circuit 224 which is controlled to be resonant at one of two predetermined frequencies by the contacts 320B of the MAN relay 320. The transistor 223 is normally maintained cutoff by a threshold bias developed across an emitter resistor 225. When seize tone is received, the tuned circuit 224 (tuned to seize tone frequency in the automatic mode) resonates, driving the transistor 223 to conduction on the positive peaks. Current through the transistor 223 charges a smoothing capacitor 222 to provide a steady output signal when seize tone is present. This signal is directed to a seize trigger stage 230 comprising transistors 232 and 233 interconnected in a Schmitt trigger circuit. The seize trigger 230 is off in the absence of seize tone, in which condition transistor 232 is cut off and transistor 233 is conducting. These states become reversed when the capacitor 222 is charged by the seize tone detector 220, thus turning the seize trigger 230 on. When seize tone is terminated, the capacitor 222 discharges through its parallel resistor, and transistor 232 becomes back-biased, returning the trigger stage 230 to the off condition. A seize inverter stage 240 including a transistor 242 is coupled to receive the output of the seize trigger stage 230. When the trigger 230 is on, transistor 242 is off and vice-versa. Cutoff bias is provided by a resistor 243 connected to a negative potential source. The output of the seize inverter stage 240 is applied to a seize slow release timer 250 which includes a transistor 252 and a timing network comprising a resistor 253 and capacitor 254. The output of the transistor 252 is coupled via a resistor 264 to drive a seize switch 260 comprising a transistor 262. When the seize inverter transistor 242 is cut off (seize tone present), transistor 252 has no emitter supply path and cannot conduct. Therefore, the output transistor 262 is turned on by current through resistors 263 and 264. The right-hand electrode of the timing capacitor 254 is clamped to the negative emitter bus through diodes 256 and 257 in series so that the capacitor 254 charges through resistor 255. When transistor 242 saturates upon the disappearance of seize tone, the emitter of transistor 252 and the left-hand electrode of capacitor 254 through diode 258 are returned to the negative emitter bus. Voltage across capacitor 254 maintains the transistor 252 in the cutoff condition until the capacitor 254 discharges sufficiently to permit transistor 252 to turn on. Conduction in transistor 252 develops a voltage across the resistor 263 which cuts off the output transistor 262 of the seize switch 260. Thus, the output of the seize switch 260 develops a negative step pulse such as 265 for each period that seize tone is received, the negative pulse 265 extending beyond the termination of seize tone by the approximately 100 milliseconds required for operation of the seize slow release stage 250.

Similar circuitry is provided for developing a negative step pulse 266, similar to the pulse 265, in response to the presence of idle tone in the signal received from the radio 40. Thus, the output of the amplifier-limiter stage 210 is also coupled to an idle detector 221 which includes a resonant circuit 227 having its resonant frequency determined by the contacts 320E and 320F of the MAN relay 320. As in the seize tone circuitry, the idle detector 221 is coupled to an idle trigger stage 231, followed by an idle inverter stage 241, an idle slow release stage 251, and an idle switch 261. Each of these stages following the idle detector 221 is identical to the corresponding stage in the seize tone circuit. In addition, an interpulse gate 226 including a transistor 228 is coupled to control the input of the idle trigger 231. In the quiescent condition, the transistor 228 is normally maintained in a saturated condition by virtue of a negative potential applied to its input via resistor 204 and contacts 340B of the DIS relay 340 (FIG. 4D). In its conducting condition, the transistor 228 serves as a discharge path for the timing capacitor 229 in the idle detector 221.

An idle slow operate timer stage 271 is also included, having a transistor 272 which is controlled by the output of the idle inverter stage 241. Before the idle tone is present, the transistor 272 is clamped in a cut-off condition by the saturated collector of the transistor in the idle inverter stage 241, via diode 273. When idle tone appears, the idle inverter stage 241 is cut off, allowing the timing capacitor 274 to charge and eventually, after 100 milliseconds, to turn on transistor 272. The idle slow operate timer stage 271 is followed by a stop search driver 276 having a transistor 277, normally cut off. When the transistor 272 turns on, current from its collector saturates transistor 277, causing the SS relay 380, connected to the collector of transistor 277, to be energized.

Figure 4B:
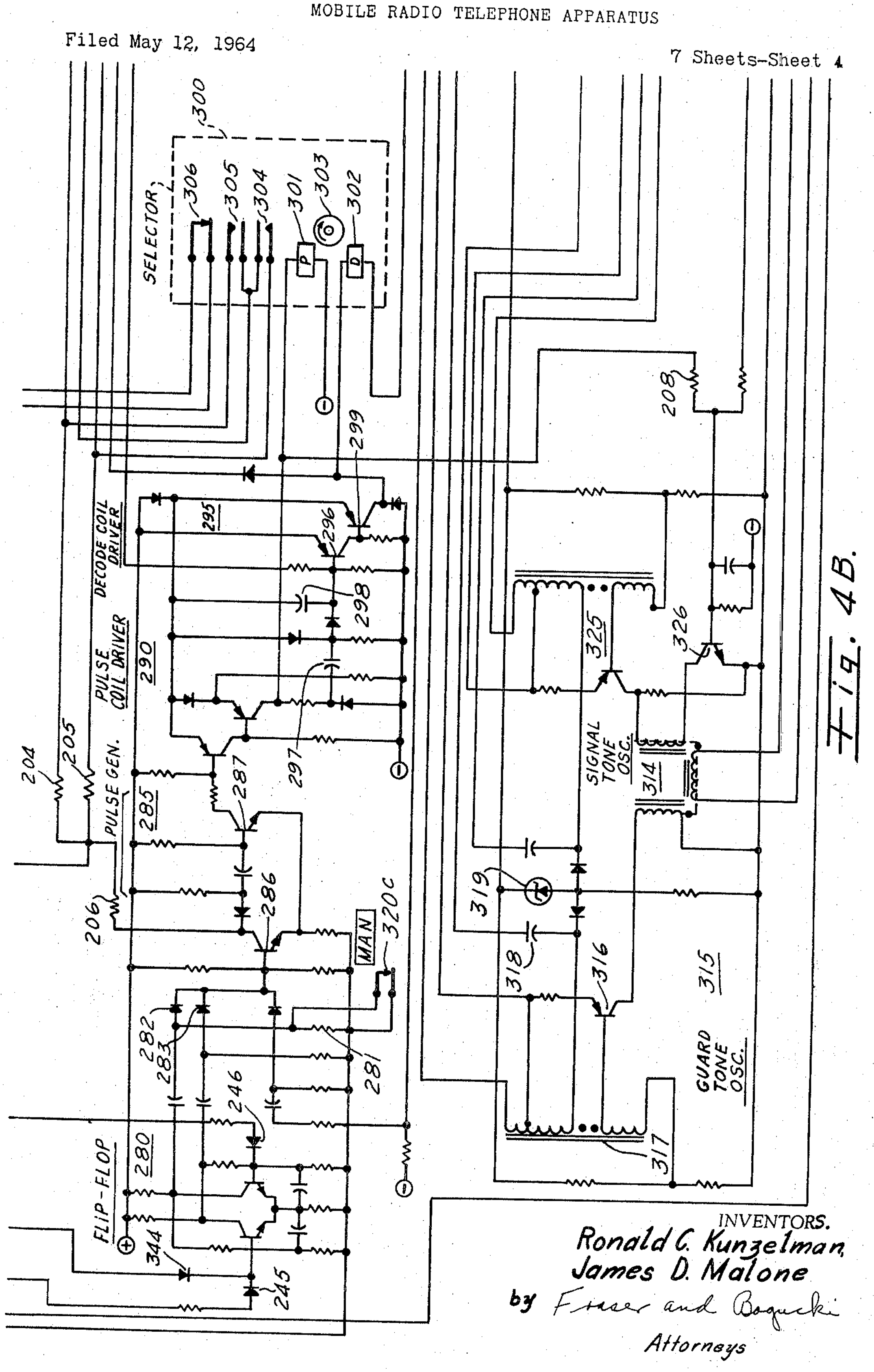

FIG. 4B shows a flip-flop stage 280 comprising a pair of transistors intercoupled in a bistable switching circuit. The flip-flop stage 280 receives output signals from the seize trigger stage 230 and the idle trigger stage 231 on alternate inputs via diodes 245 and 246 respectively. Thus, the flip-flop stage 280 is set to the idle state when the idle trigger turns on, and is set to the seize state when the seize trigger turns on. The flip-flop stage 280 remains in the conduction state to which it was last set. This provides an effective memory action which is particularly advantageous in fringe area operation by preventing brief signal drop-outs due to fading or noise from causing extra trigger signals to the pulse generator 285. Dual outputs from the flip-flop stage 280 are coupled via differentiating networks and diodes 282 and 283 to a pulse generator 285 comprising transistors 286 and 287 intercoupled in a monostable emitter-coupled multivibrator. Each time the pulse generator 285 is triggered, it generates a pulse of 25 milliseconds' duration. These pulses are amplified in a pulse coil driver 290 and serve to drive a pulse coil 301 in the selector 300. MAN relay contacts 320C, normally closed in automatic operation, provide a short-circuit path across a resistor 281 in the differentiating network in series with the diode 282 at the output of the flip-flop stage 280. This serves to block positive pulses from the flip-flop stage 280 during the transition from the idle tone condition to the seize tone condition, thus permitting the selector 300 to be pulsed only by transitions from seize tone to idle tone in accordance with the signalling operation adopted for use when the mobile station is operating in one of the automatic modes. A decode coil driver stage 295 is provided to maintain a decode coil 302 in the selector 300 energized from the start of the first pulse until a suitable interval after the end of the last pulse of each digit. The decode coil driver 295 includes an interdigit sensing transistor 296 together with an input timing network coupled to the output of the pulse coil driver 290. Transistor 296 is normally maintained saturated by its base biasing circuit. When the pulse generator 285 is triggered, a positive pulse is produced at the output of the pulse coil driver 290 which is fed through a pumping capacitor 297 to charge a timing capacitor 298 and cut off transistor 296. As long as the pulses continue regularly, the transistor 296 is maintained cut off. However, a predetermined interval after the last pulse, capacitor 298 discharges to the point where transistor 296 again conducts. When transistor 296 is cut off, the output transistor 299 of the decode coil driver 295, normally maintained cut off, is driven into saturation to energize the decode coil 302.

FIG. 4B also includes a guard tone oscillator 315 and a signal oscillator 325. The guard tone oscillator 315 employs a transistor 316 in conjunction with a parallel resonant circuit comprising a ferrite cup core transformer 317 and a capacitor 318. The resonant circuit is tuned to one or another of two guard frequencies ($F_{g1}$ and $F_{g2}$) by means of contacts 390C and 350E on the "connect" and "call latch" relays respectively. The oscillator amplitude is stabilized by a zener diode 319. Output from the guard tone oscillator 315 is taken from the collector of the transistor 316 via an output transformer 314.

The signal tone oscillator 325 is essentially the same as the guard tone oscillator 315 described above except that a signal gating transistor 326 is coupled to control the application of signal tones to the transformer 314 in accordance with particular logic conditions. Thus, the output of the signal tone oscillator 325 is coupled through the output transformer 314 only when the signal gating transistor 326 is turned on. The signal tone oscillator 325, when energized, generates one of two signal tones ($F_c$ and $F_d$) as determined by contacts 350D of the "hookswitch permissive" relay 350.

Decoding of outpulsing from a base station and generation of the Automatic Number Identification code assigned the particular mobile station are controlled by the selector 300. Basically, the selector 300 may comprise a toothed code wheel 303 which is programmable by inserted code pins for any telephone-type number. In addition to the pulse coil 301, the decode coil 302 and the code wheel 303, the selector 300 includes a pair of "correct code" contacts 304, a pair of "Automatic Number Identification" (ANI) contacts 305 and a pair of "clear" contacts 306. The respective pairs of contacts 304, 305 and 306 are actuated by the selector 300 in accordance with the various positions of the code wheel 303 and the conditions of inputs to the pulse coil 301 and the decode coil 302.

The pulse coil 301 is energized once for each pulse whereas the decode coil 302 is energized once for each digit (group of pulses). When the decode coil 302 is energized, the clear contacts 306 are opened and the code wheel 303 is permitted to be advanced one tooth for each pulse applied to the pulse coil 301. If the received digit matches the code setting, code wheel 303 is held at its advanced position upon deenergization of the decode coil 302 during the interdigital interval and the clear contacts 306 are maintained open. If the received digit is either more or less than the code setting, the code wheel 303 is returned to its rest position upon deenergization of the decode coil 302. This closes the clear contacts 306 and causes the mobile station to initiate search for the marked idle channel.

If all of the digits pulsed into the selector 300 correspond in sequence to the particular coded number assigned the mobile station, the code wheel 303 is finally rotated to the point where the correct code contacts 304 are closed, thus providing an indication to the associated supervisory control circuitry.

The selector 300 is also equipped to send its own coded number for ANI. For this purpose, the selector 300 is pulsed by a clock circuit which provides appropriate pulses for the pulse coil 301 and the decode coil 302 to rotate the code wheel 303 in appropriate steps to generate the coded digits. The ANI contacts 305 are closed each time a code pin on the code wheel 303 moves into a correct digit position, thus temporarily stopping the clock. The delayed release of the decode coil 302 provides the desired interdigital interval, following which the code wheel 303 is advanced again for the next digit. When the correct code contacts 304 close after the last digit of the assigned number, the clock driving the selector 300 is turned off.

Figure 4C:
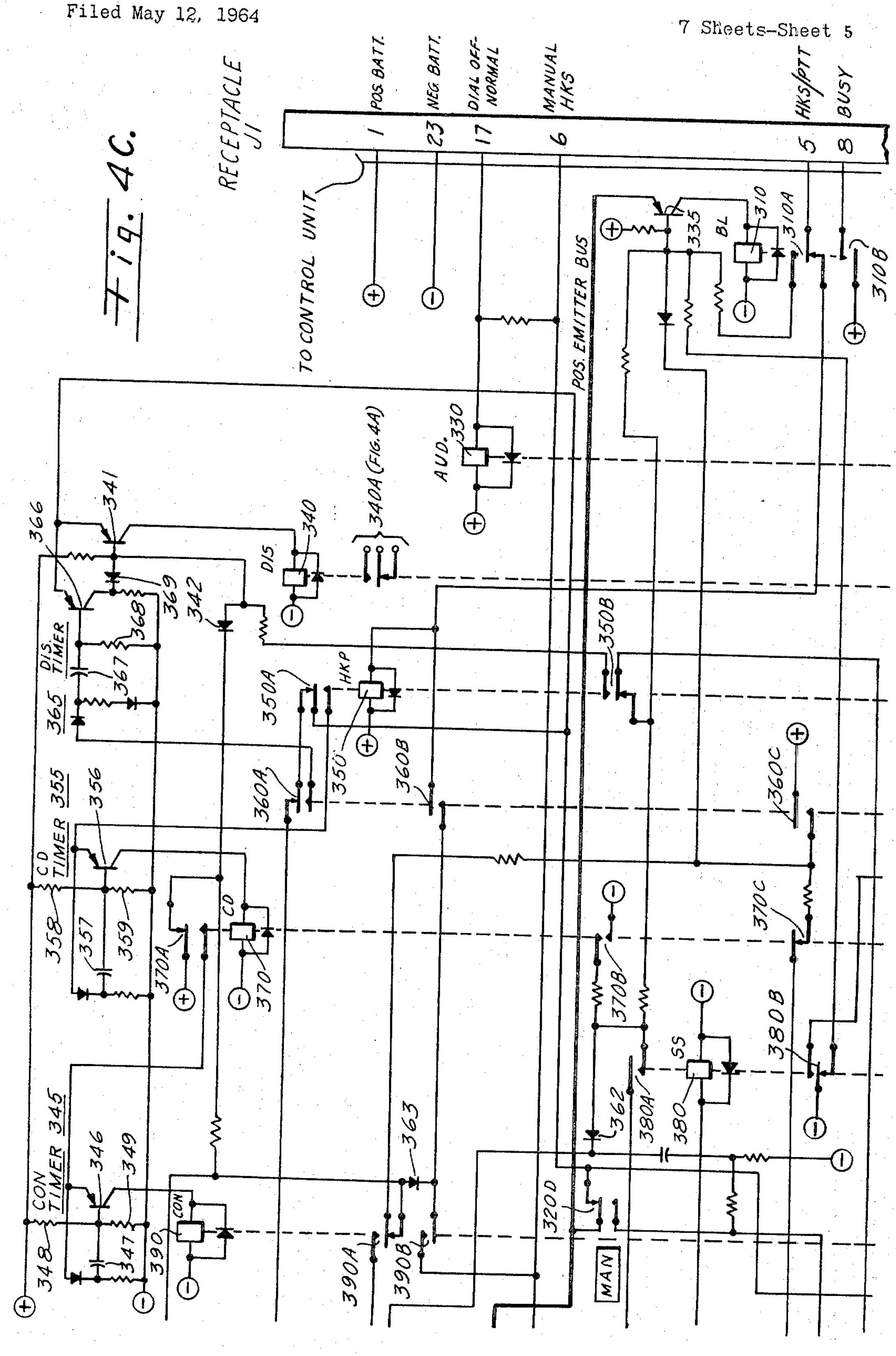
Figure 4D:
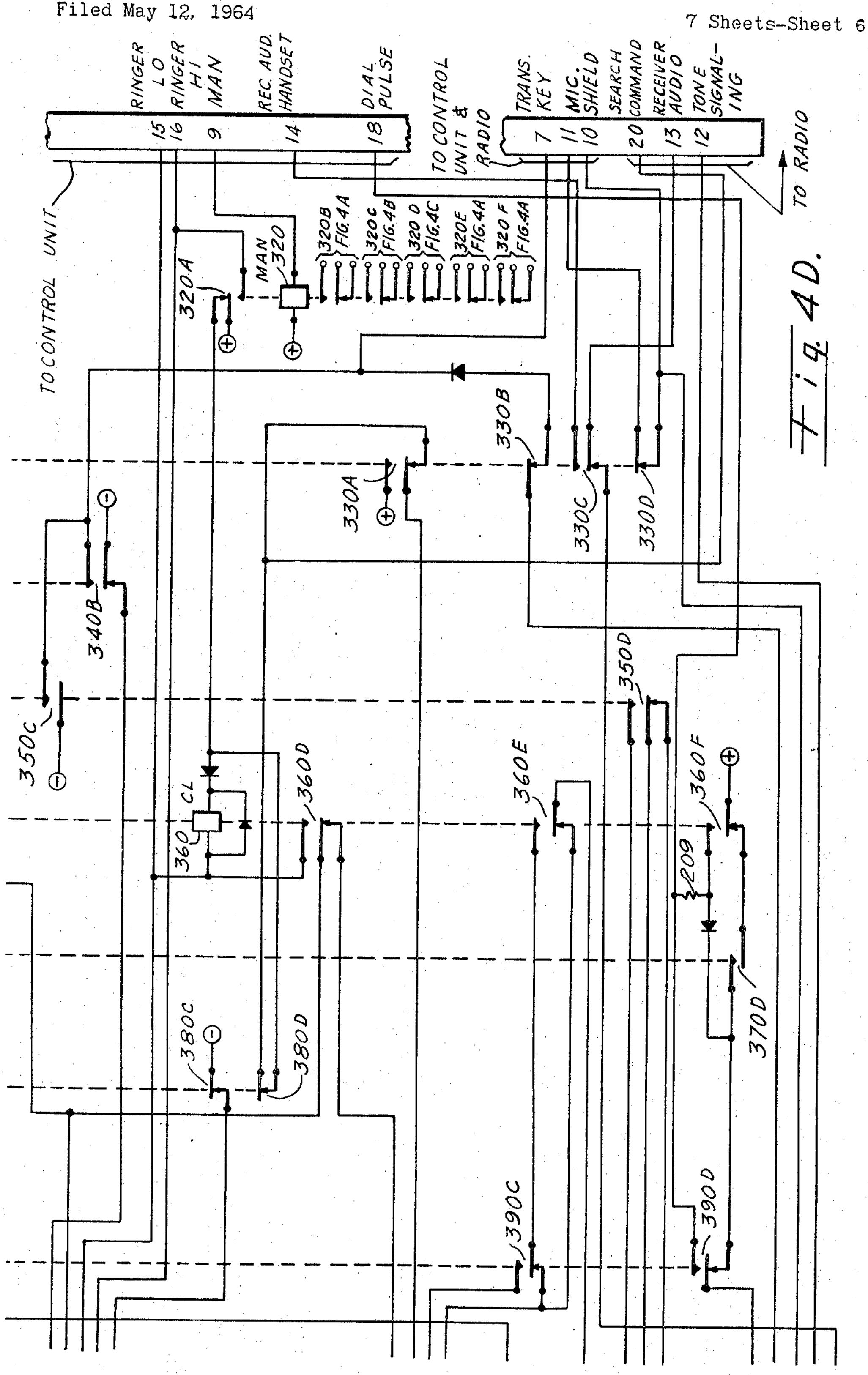

FIGS. 4C and 4D show the various relays which are employed in the supervisory circuitry. The connection of these relays and the functions of their various contacts may be described as follows:

The blocking (BL) relay 310 (FIG. 4C) is energized by the blocking transistor 335 which in turn is controlled by an OR logic circuit to block the mobile subscriber from using the system under a number of different logic conditions, such as during channel searching, during completion of a call to another mobile unit, during premature operation of the push-to-talk switch 125 in the MANUAL mode, and the like.

Contacts 310A, when operated, complete a holding circuit for the BL relay 310 from the control unit 10. When released, contacts 310A supply power to a line connected to the HKP relay 350.

Contacts 310B supply positive voltage to a line connected to the busy lamp 103 in the control unit 10.

The manual (MAN) relay 320 shown in FIG. 4D is energized whenever the mobile station is operating in the MANUAL mode by way of a circuit completed when the MANUAL mode push button 110-M of the control unit 10 is depressed. The MAN relay 320 is de-energized whenever the mobile station is operating in either the HOME or ROAM mode of automatic call completion. Most of the contacts of this relay are represented in detached contact form in various portions of FIGS. 4A–4C for the sake of simplicity.

Contacts 320A switch positive battery from the energizing circuit for the call latch (CL) relay 360 (not used in the MANUAL mode) to one side of the ringer circuit for providing continuous battery to the ringer circuit when in the MANUAL mode.

Contacts 320B (FIG. 4A) switch the resonant frequency of the tuned circuit 224 from the seize tone frequency employed in the automatic modes to one of two signalling frequencies employed in the MANUAL mode.

Contacts 320C (FIG. 4B) remove the shorting path across the resistor 281 so that pulses are applied to the input of the pulse generator 285 for each transition of the flip-flop 280 when in the MANUAL mode.

Contacts 320D (FIG. 4C) control the application of power from the positive emitter bus to a number of circuits which are energized during automatic mode operation.

Contacts 320E and 320F (FIG. 4A) control the resonant frequency of the tuned circuit 227, shifting it from the idle tone frequency in the automatic mode to the other of the two signalling frequencies which are employed in the MANUAL mode.

The handset audio (AUD) relay 330 (FIG. 4C) controls the application of audio between the radio 40 and the handset 106 and also the generation of the guard and signalling tones. The AUD relay 330 is energized when the hook switch in the control unit 10 is lifted via contacts in the CL relay 360, the CON relay 390, and back contacts of the BL relay 310. The AUD relay 330 is released by the opening of any of the contacts in the relay energizing circuit as mentioned, and may also be released by shunt-down operation through the application of positive battery to the AUD relay 330 when the dial 105 in the control unit 10 is pulled off-normal.

Contacts 330A apply positive battery to a line leading to the pulse generator 285 in order to generate a reset pulse for the selector 300 upon completion of ANI pulsing. In the released position, contacts 330A provide a path for the selector reset pulse to be generated by the release of the SS relay 380.

Contacts 330B, when activated, remove minus battery from the guard and signal tone oscillators 315 and 325.

Contacts 330C transfer receiver audio from the input of the amplifier-limiter stage 210 to the handset 106 in the control unit 10.

Contacts 330D in the released position complete a circuit path which mutes the microphone of the handset 106.

The disconnect (DIS) relay 340 is in series with a transistor 341 which in turn is controlled by the disconnect timer 365, by a path from the transistor 262 of the seize switch 260 via diode 342, or by a circuit path through contacts of the switch-hook 112, back contacts 310A of the BL relay 310, and front contacts 360B of the CL relay 360 via the diode 363. The DIS relay 340 is held operated by a path through contacts 350B of the HKP relay 350 and contacts 340A.

Contacts 340A, shown in detached form in FIG. 4A, in the released position serve to block pulses from the output of the right-hand transistor of the idle trigger 231 from being applied to the input of the flip-flop stage 280. Front contacts of the set 340A connect the input of the idle detector 221 to minus battery and complete the DIS relay 340 holding path.

Contacts 340B transfer negative battery from the input of the interpulse gate 226 to the lead supplying the negative battery bus for the guard and signal tone oscillators 315, 325.

The hook switch permissive (HKP) relay 350, when the mobile station is operating in an automatic mode, is energized by contacts of the hook-switch 112 via back contacts of the BL relay 310. When the mobile station is in the MANUAL mode, the HKP relay 350 is controlled by the PTT switch 125 in the control unit 10 (FIG. 6).

Contacts 350A in the operated condition supply positive voltage to energize the CD timer 355, and in the released condition supply positive voltage to the armature of contacts 360A.

Contacts 350B, when operated, complete a holding circuit for the DIS relay 340. In the released position, contacts 350B apply a blocking signal to the blocking relay transistor 335 via contacts 340A during the interval that the DIS relay 340 is energized.

Contacts 350C, when operated, apply negative battery to the line supplying the transmitter keying circuit and to the negative bus of the guard tone and signal oscillators, 315 and 325, via contacts 330B.

Contacts 350D control the resonant frequency of the signal oscillator 325 and determine which of the signal frequencies is generated.

The call latch (CL) relay 360 is energized in the automatic mode only by the closing of the correct code contacts 304 of the selector 300.

Contacts 360A, when operated, remove the path to the positive voltage from the clear contacts 306 of the selector 300 and apply it to initiate operation of the disconnect timer 365.

Contacts 360B, when operated, supply a negative potential to permit the CON relay 390 via contacts 390B to operate the AUD relay 330 and also energize the DIS relay 340 via diodes 363 and 342.

Contacts 360C, when operated, apply positive battery to one of the inputs to the blocking relay transistor 335, thus inhibiting any negative pulses from energizing this transistor via the inhibited input lead.

Contacts 360D, when operated, de-energize the decoding coil 302 of the selector 300 and complete a holding circuit for the CL relay 360 via contacts 380B of the SS relay 380.

Contacts 360E in conjunction with contacts 390C control the resonant circuit of the guard tone oscillator 315 and determine which of the two guard frequencies is to be generated.

Contacts 360F control the application of positive battery to the signal gate transistor 326 and also to supply a positive reference for dialing.

The connect delay (CD) relay 370 is controlled by the connect delay timer 355.

Contacts 370A, when operated, initiate operation of the connect timer 345. When released, contacts 370A inhibit the negative input signals to transistor 341 through diode 342.

Contacts 370B provide negative battery to maintain the SS relay 380 latched when operated.

Contacts 370C control one of the input paths to the blocking relay transistor 335.

Contacts 370D control the application of positive battery via contacts 360F of the CL relay 360 to the signal gate transistor 326.

The stop search (SS) relay 380 is energized by the SS driver 276 upon the detection of idle tone.

Contacts 380A are part of a latching circuit path for the SS relay 380.

Contacts 380B remove negative battery from one of the inputs to the blocking relay transistor 335 and apply it in a holding path for the CL relay 360.

Contacts 380C vary the time constant of the timing circuit of the interdigital sensing transistor 296 in the decode coil driver stage 295.

Contacts 380D control the application of positive potential to the search command lead of the channel search unit 42.

The connect (CON) relay 390 is energized by the connect timer 345, 50 milliseconds following the closure of the CD relay contacts.

The contacts 390A, when operated, provide the blocking signal for the blocking relay transistor 335 if idle tone is present after the connect interval. In the released position these contacts apply an input to the blocking relay transistor 335 in the event that seize tone is present.

Contacts 390B complete a path to energize the AUD relay 330.

Contacts 390C in conjunction with contacts 360E control the resonant frequency of the guard tone oscillator 315 and determine which of two guard frequencies is generated.

Contacts 390D control the application of positive battery to the signal gate transistor 326.

The disconnect (DIS) timer 365, comprising a transistor 366 and a timing network, capacitor 367 and resistor 368, provides a ¾-second closure of the DIS relay 340 by turning on transistor 341. The input to the DIS timer 365 is controlled through the contacts 360A of the CL relay 360. With the contacts 360A open, transistor 366 is maintained saturated by base current through resistor 368. In this condition, transistor 366 causes the diode 369 coupling the DIS timer 365 to the transistor 341 to be nonconducting. Operation of the DIS timer 365 is initiated by contact closure to the positive emitter bus through contacts 360A operated and 350A and 320D released. This causes the transistor 366 to be cut off and maintained so by current from the capacitor 367 through the resistor 368. Transistor 341 now turns on, energizing the DIS relay 340. After ¾-second, current through the resistor 368 will have discharged capacitor 367 to the point where transistor 366 again conducts, thus turning off the transistor 341 and releasing the DIS relay 340.

The connect delay (CD) timer 355, comprising transistor 356 and a timing network, capacitor 357 and resistors 358 and 359, delays the operation of the CD relay 370 by 150 milliseconds from the closure of contacts 350A on the HKP relay 350. With front contacts 350A open, transistor 356 has no emitter supply and cannot conduct. Capacitor 357 is charged by the bleeder network of resistors 358 and 359. When contacts 350A are closed by the operation of the HKP relay 350, the emitter of transistor 356 and the left-hand electrode of capacitor 357 are clamped to the positive emitter bus. Voltage across capacitor 357 maintains transistor 356 in the cutoff condition for 150 milliseconds, after which capacitor 357 discharges to the point where transistor 356 conducts, thus operating the CD relay 370 connected in series with the transistor 356.

The connect (CON) timer 345, comprising a transistor 346 and timing circuit, capacitor 347 and resistors 348 and 349, is identical in circuit configuration and operation to the CD timer 355 except for its timing interval. The CON timer 345 is controlled by the closing of front contacts 370A of the CD relay 370 and serves to energize the CON relay 390 50 milliseconds after operation of the CD relay 370.

The control unit 10 of FIG. 2 is represented schematically in FIG. 6. In addition to the elements shown in FIG. 2, the schematic diagram of FIG. 6 includes a "power on" (PWR ON) lamp 114, a dial lamp 115, a ringer 118, and a ringer (RR) relay 120. RR relay contacts 120A control the energizing circuit to the ringer 118, while the RR relay contacts 120B close a circuit through the auxiliary switch 111 to provide an external alarm during ringing if such auxiliary equipment is provided. The handset 106 includes a microphone 126, connected in series with hook switch contacts 112C, and a receiver 127 which is in series with a volume control 128. Also included in the handset 106 is a push-to-talk (PTT) switch 125 for use when operating in the MANUAL mode. The dial 105 has two sets of contacts, the off-normal (O/N) contacts 105A which are closed whenever the dial 105 is pulled out of its normal rest position and the pulse (PUL) contacts 105B which open repeatedly as the dial 105 is returning to normal after being pulled off normal in order to generate a pulse train in accordance with the particular dialed digit. Hook switch 112 is connected mechanically to control three sets of switch contacts, depicted in the position corresponding to the handset 106 being on-hook. Contacts 112A are in series with the energizing circuit for the RR relay 120. Contacts 112B when operated supply negative battery to energize the dial lamp 115. Contacts 112C complete the circuit for the microphone 126.

Mode selector pushbuttons 110 and channel selector pushbuttons 108 control switches which are interconnected as indicated. These pushbuttons are mechanically interlocked, as indicated by the dashed lines, so as to provide the following permissible operations. Pushbuttons 110–M, 110–H and 110–R are interlocked so that only one at a time may be depressed. With the MANUAL mode selector pushbutton 110–M depressed, only one at a time of the eleven channel selector pushbuttons 108 may be depressed and latched. With the ROAM mode selector pushbutton 110–R depressed, any set of the eleven channel selector pushbuttons 108 may be depressed and latched. With the HOME mode pushbutton 110–H depressed, all channel selector switches 108 are released.

The MANUAL mode selector pushbutton 110–M controls two sets of switch contacts, 131A and 131B. Contacts 131A, when released, provide a bypass for the PTT switch 125 and, in the operated position, complete a circuit from the hookswitch contacts 112B to operate the AUD relay 330 in FIG. 4C when contacts 112B are closed. The back contacts of 131B supply negative battery through contacts 133, controlled by the ROAM mode selector pushbutton 110–R, to a lead 136 connected in circuit with switch contacts controlled by the channel selector pushbuttons 108. The HOME mode selector button 110–H controls two sets of contacts, 132A and 132B, which, in the released position, supply negative battery to leads 135 and 137 respectively, both of which leads are connected in circuit with switch contacts associated with the channel selector buttons 108.

Each of the channel selector pushbuttons 108 controls two sets of switch contacts, such as 25A and 25B, respectively, in groups of switch contacts 25A–35A and 25B–35B. When released, each pair of switch contacts of the first mentioned group, such as 25A, completes the circuit path through the switch to the next pair of contacts in the group, 25A–35A. Thus, if the mobile station is to be operated in the automatic mode with the ROAM mode selector pushbutton 110–R depressed (and the button 110–H released) but without any channel selector pushbuttons 108 depressed, the negative battery is supplied through the contacts 132A and the chain of switch contacts 25A–35A to the ROAM ALL lead connected to the channel search unit 42 of the radio 40. If any one or more of the channel selector pushbuttons 108 is depressed, however, the path to the ROAM ALL lead is interrupted. Back contacts of each contact set in the group 25B–35B complete a path from the lead 136 to a corresponding channel select lead which is extended to the radio 40 and channel search unit 42. The front contacts of these contact sets complete a circuit path from the lead 137 to the corresponding channel select lead only when particular channel selector pushbutton 108 is depressed. Thus when the mobile station is operated in the ROAM mode with the mode select button 110–R depressed and selected channel selector pushbuttons 108 depressed, negative battery is applied via the lead 137 and the front contacts of the operated switches in the set 25B–35B to the designated channel select terminals in the group 25–35.

Jumper wires 130A, 130B, etc. are individually connected to the corresponding back contacts of the associated switches 25B, 26B, etc. These jumper wires, such as 130A, complete the path from the back contact of the associated switch contacts, such as 25B, to the lead 136. During installation of the mobile station equipment in a given vehicle, selected ones of these jumper wires 130A, 130B, etc., are cut or otherwise removed in accordance with a particular set of mobile radio channels which are in use in the mobile station's home area. In accordance with the circuit thus described, a channel search unit 42 and radio 40 are controlled to search for a marked idle channel among only those channels which are in use in the home area when the HOME mode selector pushbutton 110–H is depressed, and among only those channels selected by particular depressed channel select buttons 108 when the mobile station is operating in the ROAM mode with the mode selector button 110–R depressed. In the latter case, if no channel selector pushbutton 108 is depressed, the radio 40 and channel search unit 42 are controlled to search among all of the channels to which the radio can be tuned.

*Detailed description—base to mobile calling*

As described hereinabove, signaling of a selected mobile unit from a base station is accomplished by frequency shifting between seize tone and idle tone. During such signaling, the selector 300 is pulsed once for each transition from seize tone to idle tone. Pulses generated in the flip-flop 280 by transitions in the opposite direction from idle tone to seize tone are shorted out by the closed contacts 320C of the MAN relay 320 (FIG. 4B). During this signaling, the seize slow release stage 250 incorporates a 100-millisecond slow release interval to provide unbroken output for blocking from seize switch 260 to maintain the BL relay 310 operated.

When the selector 300 of the selected mobile station is fully coded, the correct code contacts 304 are closed to energize the CL relay 360. Until the customer answers, the CL relay 360 is held operated by a path through CL relay contacts 360D and SS relay contacts 380B. CL relay contacts 360F energize the signal gate transistor 326. Contacts 360A start the disconnect timer 365 which energizes the DIS relay 340 for ¾ second. To send the appropriate Acknowledgement signal, the DIS relay 340 keys the transmitter of the radio 40 and turns on the guard tone oscillator 315 and the signal oscillator 325 by applying negative battery through contacts 340B and 330B. At this time the guard tone oscillator 315 is tuned to frequency $F_{g1}$ and the signal tone oscillator 325 is tuned to frequency $F_d$. After ¾ second, the DIS relay 340 is released, thus causing the transmitter and oscillators to be turned off and releasing the BL relay 310.

When the CL relay 360 is energized, the RINGER LO lead (terminal 15 of receptacle $J_1$) is connected to negative battery via contacts 360D and SS relay contacts 380B, and the selector decoding coil 302 is disconnected, thus setting up a ringing path for the ringer 118 of FIG. 6. For each burst of ringing pulses, sent by the base station after the acknowledgement is received from the mobile, the decoding coil driver transistor 299 (FIG. 4B) energizes the RR relay 120 (FIG. 6) via the RINGER HI lead ($J_{1-16}$). The ringer 118 is thus energized under control of the ringing signal from the base terminal.

When the handset 106 is lifted as the customer answers the ringing signal, hook switch contacts 112A interrupt the energizing path to the RR relay 120. At the same time negative battery is applied to the HKS/PTT lead, thus operating the HKP relay 350 and providing a holding path for the SS relay 380 through contacts 360B of the CL relay 360, diode 363, resistor 364, diode 362 and contacts 380A of the SS relay 380 to the input of the SS driver transistor 277. Operation of the HKP relay 350 causes the transmitter of the radio 40, the guard tone oscillator 315 and the signal tone oscillator 325 to be turned on, with the signal tone oscillator 325 tuned to a frequency $F_c$ and the guard tone oscillator 315 tuned to the frequency $F_{g1}$. Contacts 350A energize the CD timer 355 to start the answer interval. After 150 milliseconds the CD relay 370 is operated. Contacts 370A energize the CON timer 345 and permit the DIS relay 340 to be energized by negative battery received through the diode 363. After an additional 50 milliseconds, the CON relay 390 operates to end the answer interval. Contacts 390D turn off the signal gate transistor 326; contacts 390B energize the AUD relay 330. Upon operation of the AUD relay 330, the guard tone oscillator 315 and the signal tone oscillator 325 are turned off by contacts 330B, the receiver 127 of the handset 106 is activated by contacts 330C, and the microphone 126 is unmuted by the opening of contacts 330D.

When the customer is finished with the call, he returns the handset 106 to its cradle, thus restoring the switch hook 112 to the position shown in FIG. 6. Contacts 112B open to release the HKP relay 350. The DIS timer 365 is thereupon energized via a path through operated contacts 360A and back contacts 350A, thus operating the DIS relay 340 for ¾ second. This in turn energizes the block driver transistor 335 through contacts 340A (FIG. 4A) and back contacts 350B to operate the BL relay 310. Also, HKP relay contacts 350D retune the signal tone oscillator 325 to a frequency $F_d$. Contacts 350A release the CD relay 370. Contacts 370A release the CON relay 390 which in turn retunes the guard tone oscillator 315 to a frequency $F_{g1}$ via contacts 390C and energizes the signal gating transistor 326 via contacts 390D. The AUD relay 330 is also released by the opening of hook switch contacts 112B. The AUD relay contacts 330D mute the microphone 126 of the handset 106 while contacts 330B turn on the guard tone and signal tone oscillators 315 and 325 respectively. Thus the disconnect signal ($F_d$ and $F_{g1}$) is transmitted. After ¾ second, the DIS timer 365 de-energizes the DIS relay 340. Dropout of the DIS relay contacts 340B removes negative battery from the transmitter of the radio 40, the guard tone oscillator 315 and the signal tone oscillator 325. Contacts 340A open the holding path for the SS relay 380 which had been maintained through back contacts 350B and the SS relay holding contacts 380A. The SS relay 380 thereupon releases and contacts 380B open the holding path for the CL relay 360. Dropout of the SS relay 380 applies a reset pulse to the selector 300 and initiates search for the marked idle channel by closing a path through contacts 380D from positive battery to the channel search command terminal ($J_{1-20}$).

*Mobile to base calling*

Inward calling, i.e. calling from a mobile unit to the base station, is initiated by removing the handset 106 from its cradle which releases the switch hook 112. Closure of contacts 112B energizes the HKP relay 350 (providing the mobile unit is unblocked and resting on the marked idle channel). Contacts 350C turn on the transmitter of the radio 40 and energize the guard tone and signal tone oscillators 315 and 325 respectively via contacts 330B. The signal tone oscillator 325 is tuned to the frequency $F_c$ and the guard tone oscillator 315 is tuned to the frequency $F_{g1}$. Contacts 350A energize the CD timer 355. After a 150-millisecond interval determined by the CD timer 355, the CD relay 370 is energized, turning on the signal gate transistor 326 via contacts 370D and beginning the connect interval by energizing the CON timer 345 via contacts 370A. At the end of the 50-millisecond connect interval, the CON relay 390 is energized, turning off the signal gate transistor 326 by the opening of contacts 390D. The guard tone oscillator 315 (tuned to $F_{g1}$) remains on.

The burst of connect signal ($F_c$ and $F_{g1}$ in combination) causes the base station to immediately remove idle tone from the marked idle channel and to place it on the next available channel. Detection of idle tone dropout causes all on-hook mobile units to be blocked, and after a 0.1 second slow-release interval the on-hook mobile units step to the next channel in search of the new marked idle channel. As has been mentioned hereinabove, seizure of the marked channel must be made by the mobile unit attempting to connect within the 50-millisecond connect interval or the mobile unit will become blocked. If the idle tone dropout occurs before the end of the connect delay interval, i.e. before the CD relay 370 operates, a negative output from the collector of the transistor in the idle inverter 241 is applied via contacts 370C to the input of the block driver transistor 335, operating the BL relay 310 which is held by the hook switch contacts until the switch hook is depressed. If idle tone is still present after the connect interval, i.e. after the CON relay 390 operates, a blocking signal is applied from the collector of the idle slow operate transistor 272 via contacts 390A to energize the block driver transistor 335 and operate the BL relay 310 which is again held until the switch hook is depressed. With a valid seizure of the channel, the signal tone oscillator 325 is cut off by the signal gate transistor 326 at the end of the connect interval, thus removing the frequency $F_c$, and the transmitter of the radio 40 remains on with $F_{g1}$ modulation from the guard tone oscillator 315, as described.

*Automatic Number Identification*

When seize tone appears on the carrier transmitted from the base station approximately ¼ second after channel seizure, the DIS relay 340 is operated by a signal from the seize switch 262 applied to the DIS driver transistor 341 via diode 342. This serves to prime the mobile unit for Automatic Number Identification (ANI). Contacts 340A cut off the idle tone detector 221 through diode 343 and release the clamp on diode 344 to permit the flip-flop 280 to follow both states of the idle trigger stage 231. Contacts 340B release the clamp on the interpulse gate 226 which had been applied through resistor 204. Transistor 262 of the seize switch 260 holds transistor 228 of the interpulse gate 226 conducting by applying current through resistor 236. When the control terminal 72 at the base station is ready, seize tone is removed as the command to the mobile unit to start pulsing ANI. Removal of seize tone cuts off the transistor 262 of the seize switch 260 which in turn back biases the transistor 228 of the interpulse gate 226. Timing capacitor 229 begins charging and after 25 milliseconds reaches sufficient potential to turn the idle trigger stage 231 to the ON state, causing the flip-flop 280 to be reset to the idle position. This triggers the pulse generator 285 just as for incoming signaling from the base terminal. Transistor 228 of the interpulse gate 226 is immediately turned on again by transistor 286 of the pulse generator 285 via resistor 206. The timing capacitor 229 then discharges through the transistor 228 and the idle trigger 231 flips back to the OFF state. This restores the flip-flop 280 to the seize state. Each time the pulse generator 285 is triggered, it produces a 25-millisecond output pulse which is applied to the pulse coil driver 290. At the end of the pulse, when the transistor 286 cuts off, transistor 228 of the interpulse gate 226 is again cut off to restart interpulse timing by the capacitor 229. In this fashion, a train of pulses is produced, each pulse having a width of 25-milliseconds and spaced from the next pulse by a 25-millisecond interval. In response to the generated pulses, the code wheel 303 of the selector 300 is advanced until a code pin is reached. The ANI contacts 305 are closed when the code wheel 303 reaches a code pin, and this stops the pulsing by turning on transistor 228 through resistor 204. The decoding coil 302 is held energized for a suitable interdigital interval determined by the timing network associated with the transistor 296, after which the decoding coil 302 is released. Release of the decoding coil 302 opens the ANI contacts 305, thus turning off transistor 228 of the interpulse gate 226 to permit the resumption of ANI pulsing. When the last ANI digit is pulsed by the selector 300, the correct code contacts 304 close and maintain transistor 228 conducting by supplying current through resistor 205, thus terminating the pulsing cycle. Each pulse to the selector coil 301 also energizes the signal gate transistor 326 through resistor 208 to permit the signal tone oscillator 325 to generate a 25-millisecond pulse of tone to be applied to the transmitter of the radio 40. During this time, the SS relay 380 is held operated by the holding path through CD relay contacts 370B.

Closure of the correct code contacts 304 also energizes the CL relay 360. Contacts 360D de-energize the decoding coil 302; contacts 360B complete a path through contacts 390B to energize AUD relay 330; and contacts 360E retune the guard tone oscillator 315 to the frequency $F_{g2}$. The AUD relay 330 activates the handset 106 through contacts 330C and 330D, tnrns off the oscillators 315 and 325 by opening contacts 330B, and provides a reset pulse for selector 300 via contacts 330A.

*Dialing*

Dialing is effected by short bursts of frequency $F_c$ from the signal tone oscillator 325 in combination with the continuous frequency $F_{g2}$ from the guard tone oscillator 315. When the dial 105 is pulled off-normal, contacts 105A close and supply positive battery to the control side of the AUD relay 330, thereby releasing this relay by shuntdown operation. Release of the AUD relay 330 mutes the handset 106 (contacts 330C and 330D) and powers the oscillators 315 and 325 (contacts 330B). Thus the frequency $F_{g2}$ is transmitted while the dial 105 is off-normal. For each pulse generated by the dial 105, corresponding to the opening of the PUL contacts 105B, negative battery is removed from the signal gate transistor 326, thus permitting positive battery via contacts 360F and the resistor 209 to turn on the signal gate transistor 326. Upon completion of dialing, the control unit 10 of the mobile station is in condition to communicate with the called customer.

*Blocking circuit*

The blocking circuit associated with the BL relay 310 is arranged to perform a predetermined logic function in order to block the mobile station if certain conditions exist when the handset 106 is lifted. In the automatic mode of operation, should the handset 106 be lifted when the mobile station is blocked, the blocking circuit is arranged to hold the BL relay 310 operated until the handset 106 is restored to the switch hook 112. As a result, when operating in the automatic mode a subscriber is prevented from breaking into an established call or one which is being placed on one of the channels by another mobile station.

The BL relay 310 is operated by a path through the back contacts 380B whenever the SS relay 380 is not operated. This prevents the mobile station from attempting to place a call during the time that the station is searching for a marked idle channel. The BL relay 310 is also energized during the times that a mobile station is sending Acknowledgement and Disconnect signals to the base station. During such times, the energizing path for the block driver transistor 335 is through the back contacts 350B of the HKP relay 350 and front contacts 340A of the DIS relay 340. When seize tone is transmitted from the base station in preparation for signalling a selected mobile station, the BL relay 310 is held operated by an output from the seize switch 260 applied via back contacts 390A of the CON relay 390. Contacts 360C of the CL relay 360 must be open in order for the seize switch output 265 to reach the block driver transistor 335.

During call initiation from the mobile station, the BL relay 310 will be operated if connection to the idle marked channel is not accomplished during the connect interval of 50 milliseconds. If idle tone drops out before the connect interval begins, a blocking signal is applied from the conducting transistor in the idle inverter stage 241 via back contacts 370C of the CD relay 370. If idle tone is still present after the termination of the connect interval, the blocking signal is applied from the conducting transistor 272 of the idle slow operate timer stage 271 via front contacts 390A of the CON relay 390. In both cases, contacts 360C of the CL relay 360 must be open in order for these signals to reach the block driver transistor 335.

Once operated, the BL relay 310 is held operated by hook switch contacts 112B if the mobile station is operating in the automatic mode and by PTT switch contacts 125 if operation is in the manual mode until such contacts are opened.

*MANUAL mode operation*

Operation of the mobile station in the MANUAL mode is similar to the procedure described above except that automatic placement of a call is not available. The MANUAL mode is selected by depressing the mode selector pushbutton 110–M which applies negative battery through contacts 131B to operate the MAN relay 320. Contacts 320A and 320B remove positive potential from the CL relay 360 and other circuits and relays which are of use only in the automatic modes. Contacts 320B, 320E and 320F change the resonant frequencies of the tuned filters 224 and 227 to accord with the frequencies employed in manual signaling. Contacts 320C open the short-circuit path around the resistor 281 to permit triggering of the pulse generator 285 for each transition between the two manual signaling tones.

A circuit is provided to avoid inadvertent transmission from the mobile station by accidental operation of the push-to-talk button when the handset 106 is removed from its cradle. In the MANUAL mode when the switch hook 112 is lifted, negative battery is applied via contacts 112B and 131A through terminal 6 of receptacles $J_{1000}$ and $J_1$ to turn off the transistor of the idle inverter stage 241 via diode 238. This is followed by the operation of the SS relay 380 100 milliseconds later, as determined by the timing capacitor 274 of the idle slow operate stage 271. Before the SS relay 380 operates, however, the BL relay 310 is held operated by the blocking driver transistor 335 which is controlled by negative battery applied through back contacts 380B of the SS relay 380. If the push-to-talk switch 125 is closed during this 100-millisecond interval, it provides a holding path for the BL relay 310 through contacts 310A so that the busy lamp 103 is energized rather than having the transmitter of the radio 40 keyed. Subsequent release of the PTT button 125 will extinguish the busy lamp 103 and permit normal operation.

There has thus been descibed a particular arrangement of equipment for use in a mobile radio telephone station to be operated in conjunction with other mobile radio telephone stations and base station equipment in an automatic mobile radio telephone system. The invention advantageously provides for the automatic operation of a mobile station in response to signals received from a base station, both in the placing of calls from a base station to a selected mobile station and in the control of signaling from the mobile station during the initiation of calls therefrom. Moreover, arrangements in accordance with the invention provide for generating appropriate signals to establish calls between a particular mobile station and a base station automatically in response to telephone switch-hook supervision at the mobile station in a manner which corresponds to similar use of a conventional wire-connected phone in a subscriber's home or office. Such automatic operation is achieved in a fashion which minimizes the exposure to multiple connection on a particular channel between a base station and a plurality of mobile stations during the placing of a call; this automatic operation in accordance with the invention further improves the effectiveness of allocated radio channels by minimizing the time during which such channels are tied up when a call is being initiated or terminated and generally improves the grade of telephone service which is presently offered to mobile radio telephone subscribers. Although the particular embodiment in accordance with the invention described above utilizes guard tones in addition to signaling tones during the transmission of various signals from a mobile station to the base station in order to protect against interference or mutilation from signal fading, it will be appreciated that guard tone signaling is not essential for the operation of the described equipment. Other methods of protection may be employed for similar purposes without departing from the scope of the invention.

Although there has been described above one specific arrangement of mobile radio telephone apparatus in accordance with the invention for the purpose of illustrating the manner in which the invention may be used to advantage, it will be appreciated that the invention is not limited thereto. Accordingly, any and all modifications, variations or equivalent arrangements which fall within the scope of the annexed claims should be considered to be a part of the invention.

What is claimed is:

1. Mobile radio telephone apparatus comprising a radio tunable to a plurality of radio channels and having channel searching means for causing the radio to be tuned in succession to different radio channels, means for selectively determining particular channels of said plurality of channels which are to be searched for a distinctive marking signal, a telephone, means responsive to signals on a channel to which the radio is tuned designating the mobile radio telephone apparatus for establishing a communication path between the telephone and the radio, means for causing the radio to search for another channel in the event the signals do not designate the mobile radio telephone apparatus, means for establishing said communication path between the telephone and the radio when the mobile radio telephone apparatus originates a call, and means for interrupting said communication path upon the termination of a call.

2. Mobile radio telephone apparatus comprising a radio tunable to a plurality of radio channels and having channel searching means for causing the radio to be tuned in succession to different radio channels, a telephone, means responsive to signals on a channel to which the radio is tuned designating the mobile radio telephone apparatus for establishing a communication path between the telephone and the radio, means for holding the radio tuned to a particular channel in response to the channel signals until a mismatch between the channel signals and the mobile designation is detected and then for causing the radio to search for another channel as soon as said mismatch is detected, and means for interrupting the communication path upon the termination of the call.

3. Mobile radio telephone apparatus comprising a radio tunable to a plurality of radio channels and having channel searching means for causing the radio to be tuned to a distinctively marked radio channel, a telephone, means responsive to signals on the channel to which the radio is tuned for establishing a communication path between the telephone and the radio, means for seizing the channel in order to establish said communication path between the telephone and the radio when the mobile radio telephone apparatus originates a call, means for limiting the interval during which the channel may be seized, and means for interrupting said communication path upon the termination of a call.

4. Mobile radio telephone apparatus comprising a radio tunable to a plurality of radio channels and having channel searching means for causing the radio to be tuned to a distinctively marked radio channel, a telephone, means responsive to signals on the channel to which the radio is tuned for establishing a communication path between the telephone and the radio, means for seizing the channel in order to establish said communication path between the telephone and the radio when the mobile radio telephone apparatus originates a call, means for limiting the interval during which the channel may be seized including means for blocking the telephone after said interval if the channel is not seized during said interval, and means for interrupting said communication path upon the termination of a call.

5. Mobile telephone apparatus in accordance with claim 4 wherein the limiting means further comprises means for delaying the start of said interval.

6. Mobile telephone apparatus in accordance with claim 5 further including timing means responsive to the delaying means for determining the length of the interval.

7. Mobile radio telephone apparatus comprising a radio tunable to a plurality of radio channels and having channel searching means for causing the radio to be tuned in succession to different radio channels; means for determining which of said plurality of channels are to be searched over the tuning band of said radio for a distinctive marking signal; the channel determining means including mode selecting means, a predetermined circuit for establishing a group of channels to be searched in a first mode of operation and channel selecting means for selecting the channels to be searched in a second mode of operation; a telephone; means responsive to signals on a channel to which the radio is tuned designating the mobile radio telephone apparatus for establishing a communication path between the telephone and the radio; means for causing the radio to search for another channel in the event the signals do not designate the mobile radio telephone apparatus; means for establishing the communication path between the telephone and the radio when the mobile radio telephone apparatus is to initiate a call; and means for interrupting said communication path upon the termination of a call.

8. Mobile radio telephone apparatus in accordance with claim 7 further including a circuit path for causing all channels to be searched in said second mode of operation for a particular state of said channel selecting means.

9. Mobile radio telephone apparatus for establishing a communication path automatically between a telephone handset and a particular radio channel in response to supervisory signals received over said channel comprising a radio tunable over a plurality of radio channels, means for causing the radio to search said channels in succession and to rest upon a particularly marked channel, means for selecting a particular mobile radio telephone apparatus in response to signals on said marked channel identifying said particular mobile radio telephone apparatus, means for causing the radio to search said plurality of radio channels immediately upon detecting a mismatch between a particular mobile radio telephone apparatus identification code and the identifying signals, a signaling device, means for establishing a circuit path between the signaling device and the radio upon completion of the identification of a selected mobile apparatus in order to permit the energization of the signaling device under the control of ringing signals appearing on said radio channel, and means for establishing a communication path between the handset of a called mobile subscriber and said radio channel upon lifting of the handset after energization of the signaling device.

10. Mobile radio telephone apparatus for establishing a communication path automatically between a telephone handset and a particular radio channel in response to supervisory signals received over said channel comprising a radio tunable over a plurality of radio channels, means for causing the radio to search only among a preselected group of said channels in succession and to rest upon a particularly marked channel, the preselected group extending over the tuning band of the radio, means for selecting a particular mobile radio telephone apparatus in response to signals on said marked channel identifying said particular mobile radio telephone apparatus, means for causing the radio to resume searching said preselected group of radio channels upon detecting a mismatch between a particular mobile radio telephone apparatus identification code and the identifying signals, a signaling device, means for establishing a circuit path between the signaling device and the radio upon completion of the identification of a selected mobile apparatus in order to permit the energization of the signaling device under the control of ringing signals appearing on said radio channel, and means for establishing a communication path between the handset of a called mobile subscriber and said radio channel upon lifting of the handset after energization of the signaling device.

11. Mobile radio telephone apparatus comprising a radio tunable to a plurality of radio channels and having channel searching means for causing the radio to be tuned in succession to different radio channels, a telephone, means responsive to signals on a channel to which the radio is tuned designating the mobile radio telephone apparatus for establishing a communication path between the telephone and the radio, means for causing the radio to search for another channel immediately upon determination that the signals do not designate the mobile radio telephone apparatus, means for establishing a communication path between the telephone and the radio when the mobile radio telephone apparatus originates a call, and a blocking circuit for blocking said last mentioned means upon the occurrence of a predetermined condition.

12. Mobile radio telephone apparatus in accordance with claim 11 further including means for energizing said blocking circuit when the radio is searching for the distinctively marked channel, when mobile station designating signals are being received over a radio channel to which the radio is tuned, or when the radio is transmitting supervisory signals related to a pre-existing call.

13. Mobile telephone apparatus in accordance with claim 11 further including indicating means coupled to the blocking circuit for indicating a blocking condition and means coupled to the telephone for energizing the indicating means only in the event the telephone is off-hook.

14. Mobile telephone apparatus in accordance with claim 13 wherein said means coupled to the telephone comprises a hookswitch and the indicating means comprises a light which is energized through the hookswitch.

15. Mobile radio telephone apparatus comprising a radio tunable to a plurality of radio channels and having channel searching means for causing the radio to be tuned in succession to different radio channels, means for determining which of said plurality of channels are to be searched for a distinctive marking signal in an automatic mode of operation of the apparatus, means for causing the apparatus to be operated in a manual mode, a telephone, means for establishing a communication path between the telephone and radio, means for blocking the communication path establishing means in the event of an attempt to cause the radio to transmit in the manual mode within a predetermined interval following the establishment of the telephone in an off-hook condition, and means for providing an indication of said blocked condition.

16. Mobile radio telephone apparatus comprising a radio tunable to a plurality of radio channels and having channel searching means for causing the radio to be tuned in succession to different radio channels, means for selectively determining which of said plurality of channels are to be searched for a distinctive marking signal, a telephone, means responsive to signals on a channel to which the radio is tuned designating the mobile radio telephone apparatus for establishing a communication path between the telephone and the radio, means for causing the radio to search for another channel in the event the signals do not designate the mobile radio telephone apparatus, means for establishing said communication path between the telephone and the radio when the mobile radio telephone apparatus originates a call, means for blocking the mobile telephone apparatus from originating a call while said radio is searching for another channel, and means for interrupting said communication path upon the termination of a call.

17. Mobile radio telephone apparatus for use in conjunction with a radio tunable to a plurality of radio channels, channel searching means for causing the radio to be tuned in succession to different radio channels, and a telephone, comprising means for determining which of said plurality of channels are to be searched for a distinctive marking signal, means for establishing a communication path between the telephone and the radio when a call is to be originated from the telephone, means for controlling said path establishing means in response to supervisory signals received over the channel to which the radio is tuned, means for blocking the path establishing means under predetermined conditions, first means for energizing the blocking means in the event of the premature occurrence of a particular supervisory signal from said radio channel, and second means for energizing the blocking means in the event of the late occurrence of said supervisory signal.

18. Mobile radio telephone station apparatus comprising a radio tunable over a plurality of channels, means for causing the radio to search said channels in sequence and to come to rest upon a particularly marked channel, a mobile station telephone, means for establishing a communication path between the mobile station telephone and a particular radio channel upon origination of a call from the mobile station telephone including means for generating a signal over said channel upon the telephone going off-hook, timing means cooperative with signals on said radio channel for limiting the time interval during which said communication path may be established, and means connected to the timing means for blocking the establishment of said path if path establishment is not effected within said time interval.

19. For use in mobile radio telephone apparatus having a radio tunable to a plurality of radio channels and a telephone, the combination comprising means for determining without limitation of the radio tuning band which of said plurality of channels are to be searched for a distinctive marking signal, means responsive to signals on a channel to which the radio is tuned designating the mobile radio telephone apparatus for establishing a communication path between the telephone and the radio, means for causing the radio to search for another channel in the event the designating signals do not designate the associated mobile radio telephone apparatus, means for establishing the communication path between the telephone and the radio when the mobile radio telephone apparatus originates a call, and means for interrupting said communication path upon the termination of a call.

20. For use in mobile radio telephone apparatus having a radio tunable to a plurality of radio channels and a telephone, the combination of means for determining without limitation of the radio tuning band which of said plurality of channels are to be searched for a distinctive marking signal, means responsive to signals on a channel to which the radio is tuned designating the mobile radio telephone apparatus for establishing a communication path between the telephone and the radio, means for holding the radio tuned to a particular channel in response to the channel signals until it is determined that the mobile radio telephone apparatus is not to be engaged in a call being initiated over the channel and then for causing the radio to search for another channel as soon as said determination is made, and means for interrupting the communication path on the termination of the call.

21. The combination in accordance with claim 20 further including means for blocking the telephone from originating a call under predetermined conditions of operation, said last mentioned means comprising a transistor logic circuit having a plurality of inputs corresponding to respective predetermined logic conditions.

22. The combination in accordance with claim 21 further including circuit means coupled to the inputs of said transistor circuit for providing a blocking signal during the time that the radio is searching for another channel, while mobile station designating signals are being received, or while the radio is transmitting supervisory signals related to a pre-existing call.

23. For use in mobile radio telephone apparatus having a radio and a telephone, the combination of means responsive to signals received by the radio designating the radio telephone apparatus for establishing a communication path between the telephone and the radio, means for causing the radio to transmit signals when the mobile radio telephone apparatus originates a call, and means responsive to a particular condition of signals received by the radio occurring only within a predetermined interval following the transmission of said transmitted signals from the radio for establishing a communication path between the telephone and radio.

24. Mobile radio telephone apparatus comprising a radio tunable to a plurality of radio channels and having channel searching means for causing the radio to be tuned to a distinctively marked radio channel, a telephone, means responsive to received signals designating the mobile radio telephone apparatus for establishing a communication path between the telephone and the radio, means for causing the radio to search for another marked channel immediately upon detection of a mismatch between said received signals and a designation assigned to said apparatus, means for seizing the marked channel in order to establish said communication path between the telephone and the radio when the mobile radio telephone apparatus originates a call, means for limiting the interval during which the channel may be seized, and means for interrupting said communication path upon the termination of a call.

25. For use in mobile radio telephone apparatus having a radio tunable to a plurality of radio channels and a telephone, the combination of means responsive to the presence of a distinctive marking signal on one of said channels for maintaining the radio tuned to the marked channel, a code selector responsive to variations in said distinctive marking signal indicative of a particular mobile radio telephone apparatus designation for comparison with the designation assigned the associated mobile radio telephone apparatus, and means responsive to the code selector for overriding said first mentioned means upon the detection of a mismatch between the mobile radio telephone apparatus designation indicated by the variation of said marking signal from the designation of the associated mobile radio telephone apparatus.

26. The combination in accordance with claim 25 further including a signaling device and means responsive to the code selector for establishing a control path between the radio and the signaling device upon receipt of a designation corresponding to the designation of the associated mobile radio telephone apparatus in order to permit the control of the signaling device in response to ringing signals received over said radio channel.

27. The combination in accordance with claim 25 further including means for establishing a communication path between the telephone and the radio upon the detection of a matching comparison between the designation received over said channel and the designation assigned the associated mobile radio telephone apparatus.

28. For use in mobile radio telephone apparatus having a radio and a telephone, the combination of means responsive to signals received by the radio designating the radio telephone apparatus for establishing a communication path between the telephone and the radio, means for causing the radio to transmit signals when the mobile radio telephone apparatus originates a call, means responsive to particular signals received by the radio within a predetermined interval following the transmission of said signals from the radio for establishing a communication path between the telephone and the radio, and means for blocking the establishment of said communication path upon call origination by the mobile radio telephone apparatus in the event that said particular signals are not received by the radio within said predetermined interval.

29. For use in mobile radio telephone apparatus having a radio and a telephone, the combination of means responsive to signals received by the radio designating the radio telephone apparatus for establishing a communication path between the telephone and the radio, means for causing the radio to transmit signals when the mobile radio telephone apparatus originates a call, means responsive to particular signals received by the radio within a predetermined interval following the transmission of said signals from the radio for establishing a communication path between the telephone and the radio, and interval limiting means comprising a first timing means for defining the beginning of said interval and a second timing means responsive to said first timing means for defining the termination of said interval.

References Cited

UNITED STATES PATENTS

| | | | |
|---|---|---|---|
| 2,599,097 | 6/1952 | Entz et al. | 179—84 |
| 2,864,957 | 12/1958 | Laschenski | 334—21 |
| 3,118,018 | 1/1964 | Cornell et al. | 179—41 |
| 3,173,996 | 3/1965 | Rypinski | 179—41 |

KATHLEEN H. CLAFFY, *Primary Examiner.*

A. H. GESS, *Assistant Examiner.*